United States Patent
Akabori et al.

(10) Patent No.: US 6,640,181 B2
(45) Date of Patent: Oct. 28, 2003

(54) VEHICLE VELOCITY CONTROL APPARATUS AND METHOD WITH PRECEDING VEHICLE FOLLOWING CONTROL FUNCTION

(75) Inventors: Kouichi Akabori, Yokohama (JP); Yosuke Kobayashi, Yokohama (JP); Yoshinori Yamamura, Yokohama (JP); Yoji Seto, Kanagawa (JP); Hideaki Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 73 days.

(21) Appl. No.: 10/058,109

(22) Filed: Jan. 29, 2002

(65) Prior Publication Data

US 2002/0111733 A1 Aug. 15, 2002

(30) Foreign Application Priority Data

Feb. 15, 2001 (JP) ........................................ 2001-038923

(51) Int. Cl.[7] .............................................. G06F 17/00
(52) U.S. Cl. ............................ 701/96; 701/93; 180/170
(58) Field of Search .............................. 701/96, 93, 36; 180/170

(56) References Cited

U.S. PATENT DOCUMENTS

| | | | | |
|---|---|---|---|---|
| 5,529,139 A | * | 6/1996 | Kurahashi et al. | 180/169 |
| 6,185,499 B1 | * | 2/2001 | Kinoshita et al. | 701/96 |
| 6,188,950 B1 | * | 2/2001 | Tsutsumi et al. | 701/96 |
| 6,249,738 B1 | | 6/2001 | Higashimata et al. | 701/96 |
| 6,311,121 B1 | * | 10/2001 | Kuragaki et al. | 701/96 |
| 6,330,507 B1 | * | 12/2001 | Adachi et al. | 701/96 |
| 6,370,470 B1 | * | 4/2002 | Yamamura et al. | 701/96 |
| 6,389,351 B1 | * | 5/2002 | Egawa et al. | 701/93 |
| 6,401,024 B1 | * | 6/2002 | Tange et al. | 701/96 |
| 6,415,217 B1 | * | 7/2002 | Higashimata et al. | 701/96 |
| 6,430,494 B1 | * | 8/2002 | Inoue et al. | 701/96 |
| 6,459,982 B1 | * | 10/2002 | Kobayashi et al. | 701/93 |
| 6,505,111 B1 | * | 1/2003 | Tange et al. | 701/96 |

FOREIGN PATENT DOCUMENTS

| | | |
|---|---|---|
| JP | 10-205367 | 8/1998 |
| JP | 11-334552 | 12/1999 |

OTHER PUBLICATIONS

2003/0028311—Seto et al—Feb. 6, 2002—Adaptive control system for vehicle.*
2002/0133285—Hirasago—Sep. 19, 2002—Vehicle traveling control system with state display apparatus.*

* cited by examiner

Primary Examiner—William A. Cuchlinski, Jr.
Assistant Examiner—Olga Hernandez
(74) Attorney, Agent, or Firm—Foley & Lardner

(57) ABSTRACT

In vehicle velocity control apparatus and method for an automotive vehicle, a first following control is allowed to be executed when a vehicle velocity of the vehicle (host vehicle) Vcar is equal to or higher than a first set vehicle velocity V1 and a second following control is allowed to be executed when the vehicle velocity of the host vehicle Vcar is equal to or lower than a second set vehicle velocity V2 which is lower than first set vehicle velocity V1. Hence, a vehicle driver can accurately determine which of the first and second following controls is being executed by confirming the vehicle velocity of the host vehicle Vcar at which the corresponding one of the controls is started to be executed through a speedometer of the vehicle.

16 Claims, 25 Drawing Sheets

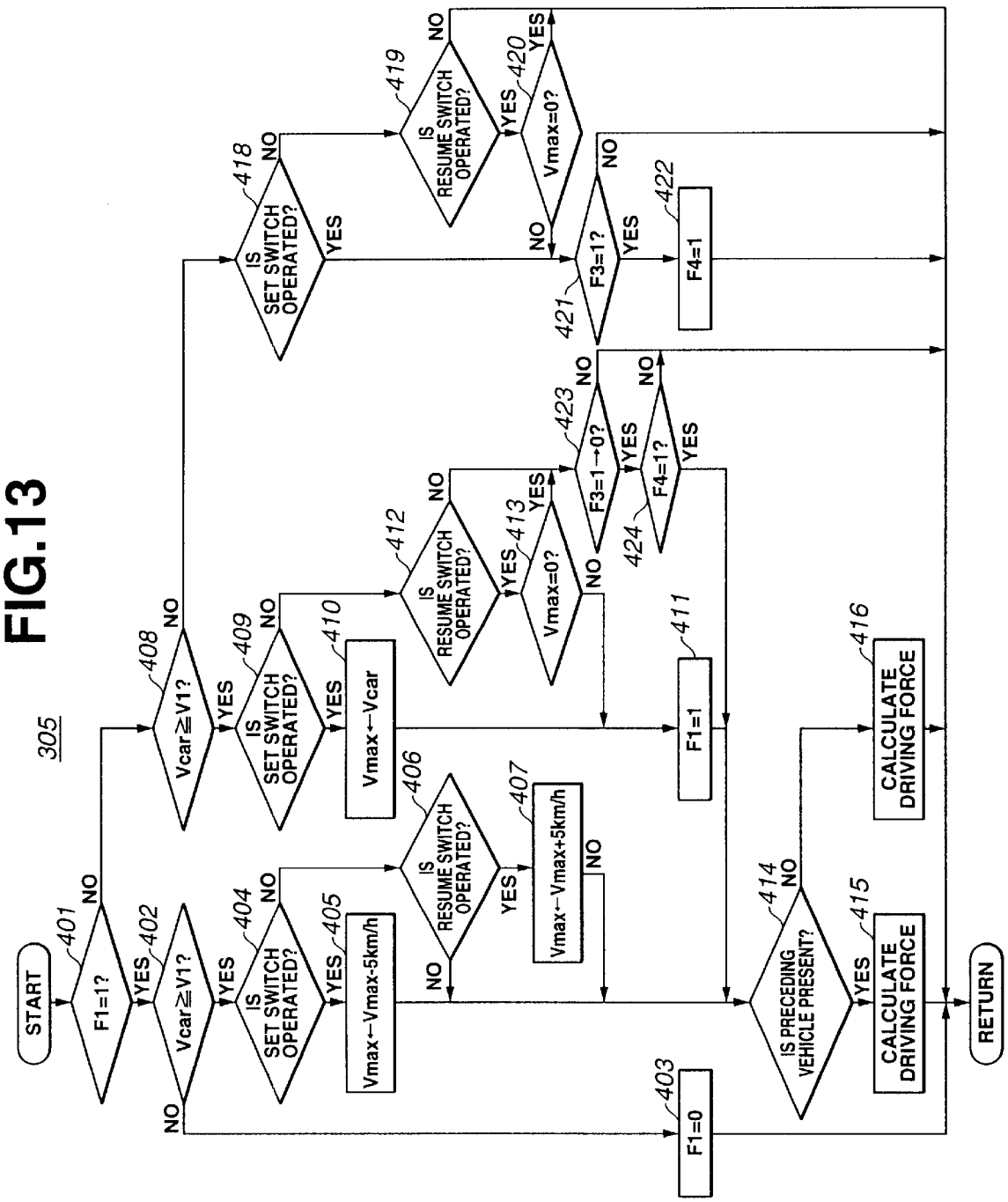

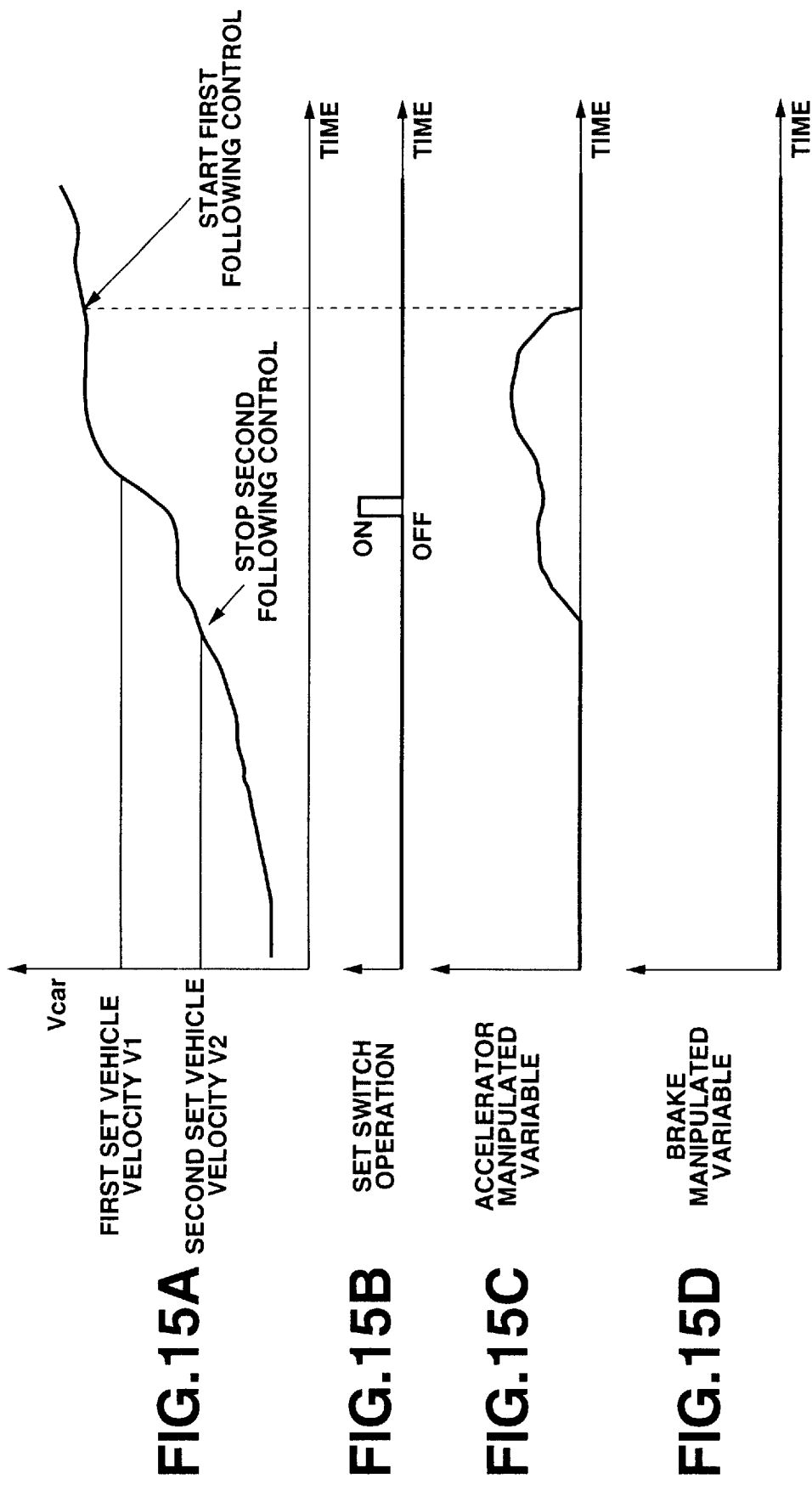

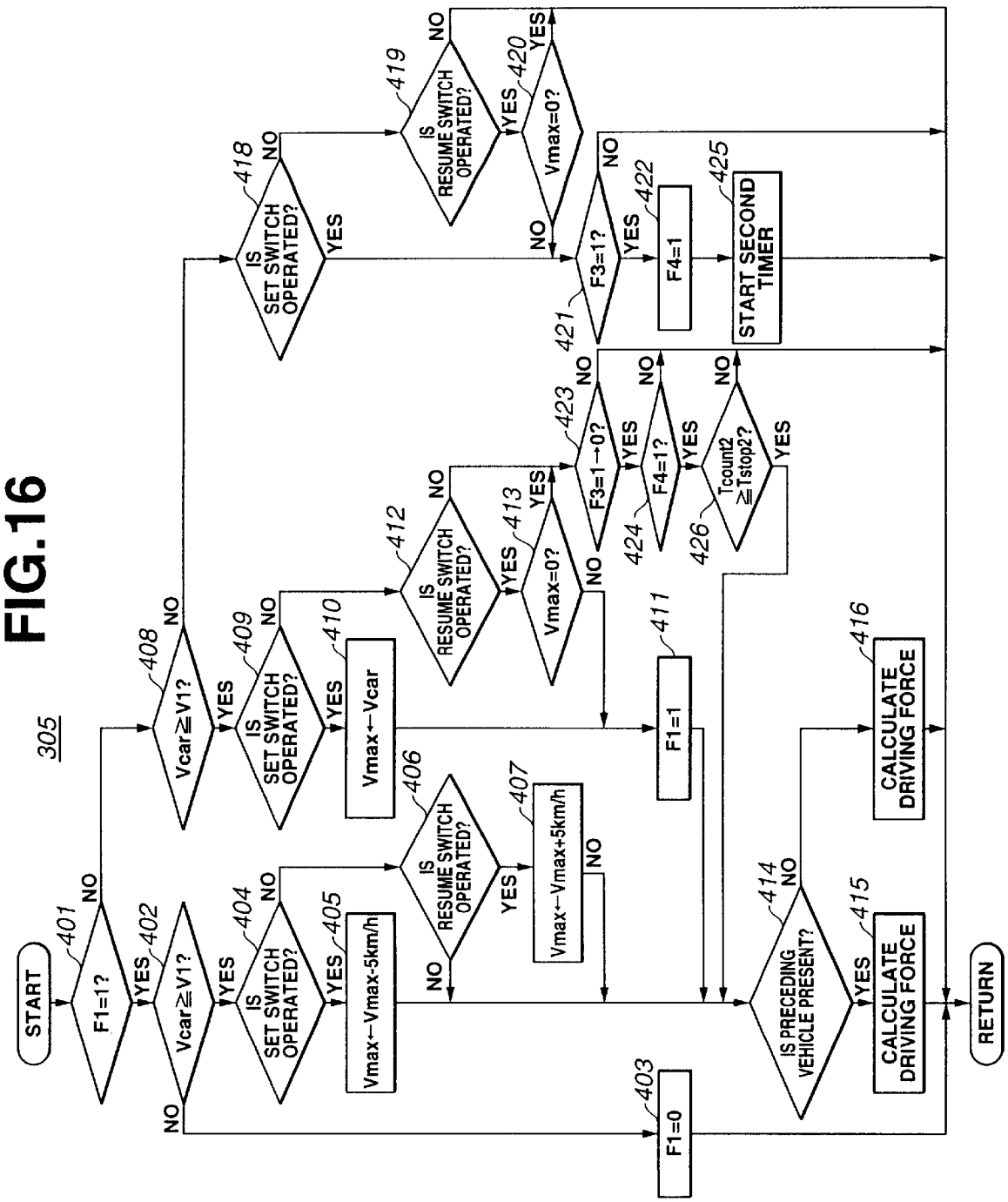

FIG.23A
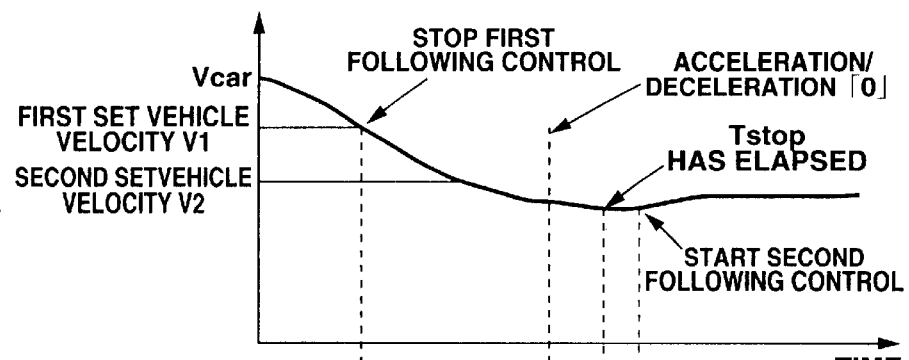
FIG.23B SET SWITCH OPERATION
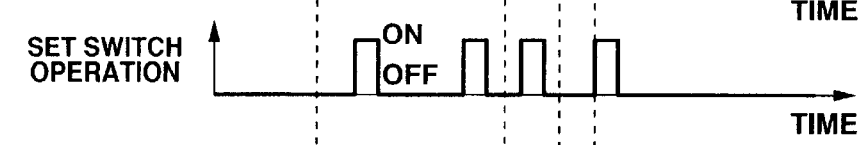
FIG.23C ACCELERATION/ DECELERATION
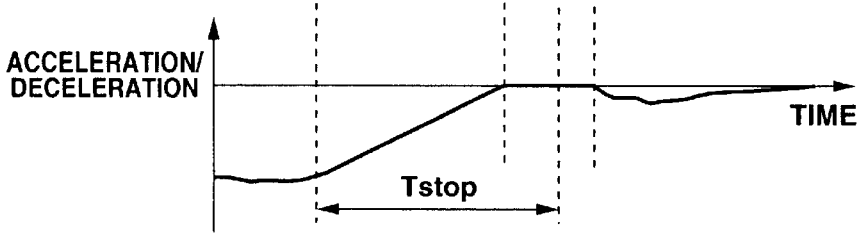

VEHICLE VELOCITY CONTROL APPARATUS AND METHOD WITH PRECEDING VEHICLE FOLLOWING CONTROL FUNCTION

BACKGROUND OF THE INVENTION

1. Field of the Invention

The present invention relates to vehicle velocity control apparatus and method for an automotive vehicle (hereinafter, also called a host vehicle) having a function of following a preceding vehicle which is traveling ahead of the vehicle on the same traffic lane.

2. Description of the Related Art

A U.S. Pat. No. 6,249,738 B1 issued on Jun. 19, 2001 (which corresponds to a Japanese Patent Application First Publication No. Heisei 11-334552 published on Dec. 7, 1999) exemplifies a previously proposed preceding vehicle following control apparatus in which the host vehicle automatically follows the preceding vehicle, during a high-speed run, in a vehicle velocity range (for example, 40 Km/h to 110 Km/h) equal to or higher than a predetermined vehicle velocity. In such a previously proposed preceding vehicle following control apparatus as described in the above-described United States Patent, the vehicle velocity of the host vehicle at a time point at which a vehicular driver operates a switch is an upper limit of a controllable vehicle velocity range within which the following control is executed and, when no preceding vehicle is present, a cruise run (constant speed traveling) is carried out at the upper limit value of the controllable vehicle velocity range.

In addition, a Japanese Patent Application First Publication No. Heisei 10-205367 published on Aug. 4, 1998 exemplifies a previously proposed congestion-oriented preceding vehicle following control apparatus. In this previously proposed congestion-oriented preceding vehicle following control apparatus, during a traffic congestion, the host vehicle automatically follows the preceding vehicle within a vehicle velocity range which is equal or below a predetermined vehicle velocity.

SUMMARY OF THE INVENTION

However, for the former and latter previously proposed preceding vehicle following control apparatuses, a different control is executed when no preceding vehicle is present but the same contents of control are executed in respect of making the host vehicle follow the preceding vehicle when the preceding vehicle is detected to be present.

Therefore, suppose that, in order to architect a vehicle velocity control system having both of the functions that the preceding vehicle following controlling apparatus and the congestion-oriented following controlling apparatus have, two controls are automatically switched therebetween on the basis of a vehicle velocity of the host vehicle in such a way that one of the controls which is used in the former previously proposed preceding vehicle following control apparatus is executed when the vehicle velocity of the host vehicle is equal to or higher than a switching host vehicle velocity value and the other of the controls which is used in the latter congestion-oriented following control apparatus when the velocity of the host vehicle is below the switching host vehicle velocity value.

However, for example, when the preceding vehicle is present with the velocity of the host vehicle approximately around the switching vehicle velocity value, a motion of the host vehicle remains unchanged even if either one of the controls is executed. Hence, it is difficult for a driver of the host vehicle to recognize which one of both of the two controls is executed and the driver may be introduced into a misunderstanding of which one of the controls is executed.

It is, hence, an object of the present invention to provide vehicle velocity control apparatus and method for an automotive vehicle which enable for the vehicle driver to determine accurately which control of either a first following control to be executed during a high-speed run or a second following control to be executed during a low-speed run of the host vehicle is being executed.

According to one aspect of the present invention, there is provided a vehicle velocity control apparatus for an automotive vehicle, comprising: a vehicle velocity detecting section that detects a velocity of the vehicle; a preceding vehicle detecting section that detects a preceding vehicle which is running ahead of the vehicle; a first following vehicle velocity control section that executes a first following control to control the vehicle velocity of the vehicle to make the vehicle velocity of the vehicle substantially equal to a predetermined vehicle velocity when no preceding vehicle is detected and, when the preceding vehicle is detected, to make the vehicle follow the preceding vehicle with the predetermined vehicle velocity as an upper limit on the basis of detected results by the vehicle velocity detecting section and the preceding vehicle detecting section; a first following control start requesting section that requests the first following vehicle velocity control section to start the first following control; a second following vehicle velocity control section that executes a second following control to control the velocity of the vehicle to make the vehicle follow the preceding vehicle when the preceding vehicle is detected on the basis of the detected results by the vehicle velocity detecting section and the preceding vehicle detecting section; a second following control start requesting section that requests the second following vehicle velocity control section to start the second following control: a first request allowing section, included in the first following vehicle velocity control section, that allows the request to start the first following control from the first following control start requesting section when the vehicle velocity of the vehicle detected by the vehicle velocity detecting section falls in a velocity range equal to or higher than a preset first set vehicle velocity; and a second request allowing section, included in the second following vehicle velocity control section, that allows the request to start the second following control from the second control start requesting section when the velocity of the vehicle falls in another velocity range which is equal to or lower than a preset second set vehicle velocity which is lower than the first set vehicle velocity.

According to another aspect of the present invention, there is provided a vehicle velocity control method for an automotive vehicle, comprising: detecting a velocity of the vehicle; detecting a preceding vehicle which is running ahead of the vehicle; executing a first following control to control the vehicle velocity of the vehicle to make the vehicle velocity of the vehicle substantially equal to a predetermined vehicle velocity when no preceding vehicle is detected and, when the preceding vehicle is detected, to make the vehicle follow the preceding vehicle with the predetermined vehicle velocity as an upper limit on the basis of detected results in detecting the vehicle velocity of the vehicle and detecting the preceding vehicle; requesting to start the first following control; executing a second following control to control the velocity of the vehicle to make the vehicle follow the preceding vehicle when the preceding vehicle is detected on the basis of the detected results in detecting the vehicle velocity of the vehicle and detecting the preceding vehicle; requesting to start the second following control; allowing the request to start the first following control when the detected vehicle velocity of the vehicle falls in a velocity range equal to or higher than a preset first set vehicle velocity; and allowing the request to start the second following control when the detected velocity of the vehicle falls in another velocity range which is equal to or lower than a preset second set vehicle velocity which is lower than the first set vehicle velocity.

This summary of the invention does not necessarily describe all necessary features so that the invention may also be a sub-combination of these described features.

BRIEF DESCRIPTION OF THE DRAWINGS

FIG. 13 is a detailed flowchart of the first driving force calculation process executed by the adaptive cruise controller and which corresponds to FIG. 4 in a case of a fourth preferred embodiment of the vehicle velocity control apparatus according to the present invention.

FIGS. 15A, 15B, 15C, and 15D are characteristic graphs for explaining an operation of the fourth preferred embodiment of the vehicle velocity control apparatus according to the present invention.

FIG. 16 is a detailed flowchart of the first driving force calculation process executed by the adaptive cruise controller and which corresponds to FIG. 13 in a case of a fifth preferred embodiment of the vehicle velocity control apparatus according to the present invention.

FIGS. 23A, 23B, and 23C are characteristic graphs for explaining an operation of the vehicle velocity control apparatus in a case of the eighth preferred embodiment according to the present invention.

DETAILED DESCRIPTION OF THE PREFERRED EMBODIMENTS

Reference will hereinafter be made to the drawings in order to facilitate a better understanding of the present invention.

Figure 1:
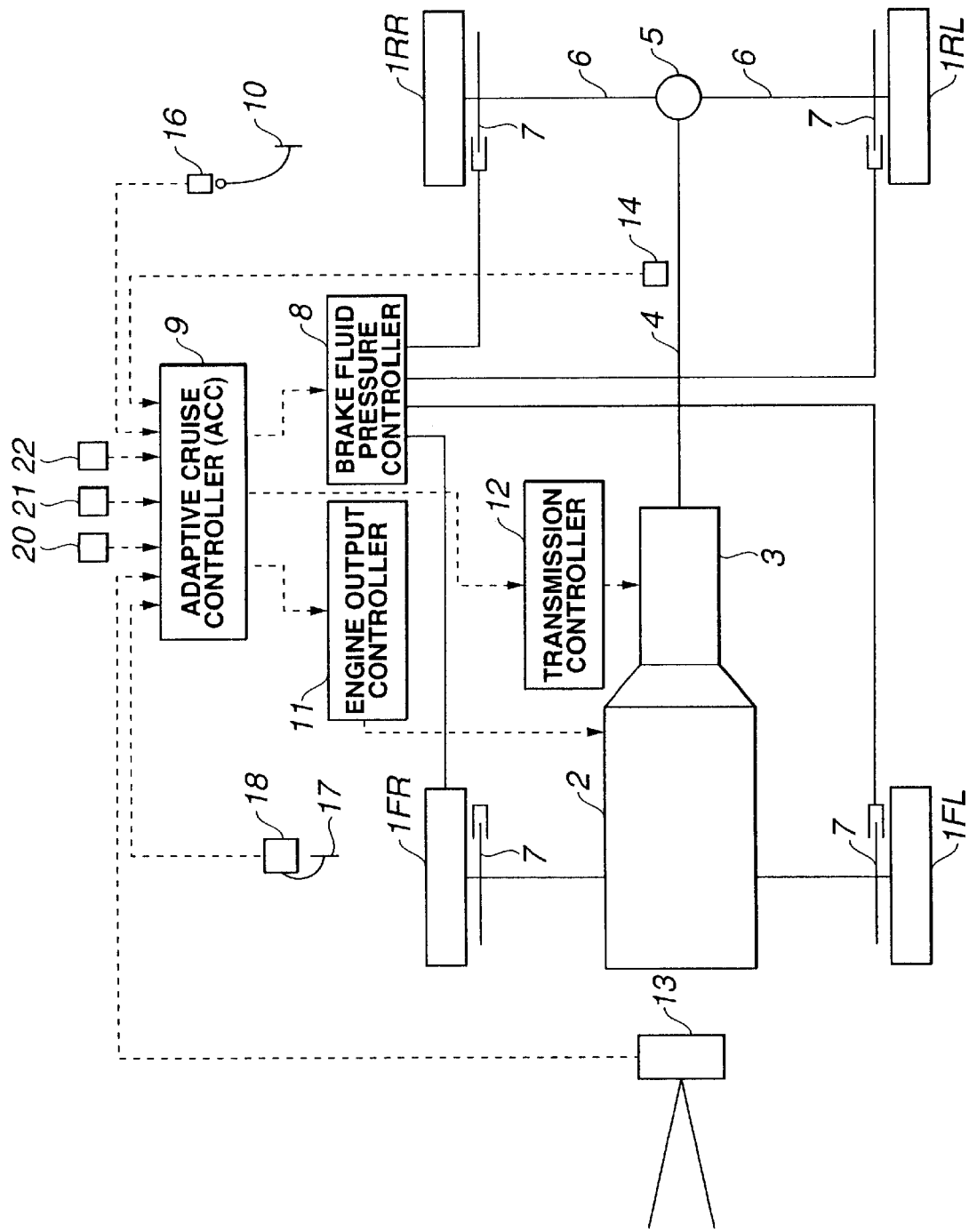
FIG. 1 is a schematic block diagram of a rough configuration of a vehicle velocity control apparatus in a first preferred embodiment according to the present invention.

FIG. 1 shows a rough configuration of a rear-wheel-drive vehicle to which a vehicle velocity control apparatus in a first preferred embodiment according to the present invention is applicable. In FIG. 1, front left and right road wheels 1FL and 1FR are non-driven wheels and rear left and right road wheels 1RL and 1RR are driven wheels. A driving force of an engine 2 is transmitted to rear left and right road wheels 1RL and 1RR via an automatic transmission A/T 3, a propeller shaft 4, a final speed-reduction gear unit 5, and a wheel axle 6.

Brake actuators 7 are constituted by, for example, disc brakes which develop braking forces on the front left and right and rear left and right road wheels 1FL, 1FR, 1RL, and 1RR. A brake fluid pressure controller 8 controls a braking oil pressure of each brake actuator 7. Brake fluid pressure controller 8 controls a brake fluid pressure of each disc brake 7. Brake fluid pressure controller 8 receives a target brake pressure calculated by an adaptive cruise controller (ACC) 9 as a command value and is operated to develop the target brake force. The target brake pressure is calculated in accordance with a depression depth of a brake pedal 10 at an ordinary driving of the vehicle. During a vehicle velocity control, the target brake pressure is calculated in accordance with control logics by which the vehicle velocity of host vehicle Vcar to make the vehicle follow a preceding vehicle which is running ahead of the host vehicle and control logics by which the vehicle velocity of the host vehicle is controlled to make the vehicle velocity of the host vehicle substantially equal to a predetermined vehicle velocity.

In addition, an engine output controller 11 to control an output of engine 2 is installed on engine 2 of the vehicle shown in FIG. 1. Engine output controller 11 adjusts an opening angle of a throttle valve of engine 2 and/or a fuel injection quantity of engine 2 to control an output torque of engine 2. Engine output controller 11 controls an engine output in accordance with an engine torque command value. Furthermore, an automatic transmission controller 12 is disposed to control an instantaneous gear-speed range position and a working fluid pressure suitable for the instantaneous gear-speed range position of automatic transmission 3. Transmission controller 12 controls the gear-speed range position and working fluid pressure in accordance with a gear shift command value outputted from adaptive cruise controller 9. A radar unit 13 to detect a distance between the host vehicle and the preceding vehicle is attached onto a front end of the host vehicle. Radar unit 13 is constituted by, for example, a laser radar which radiates a laser light beam toward the preceding vehicle, receives a reflected light beam from the preceding vehicle, and measures a spatial distance between the preceding vehicle and the host vehicle (so-called, an inter-vehicle distance). A vehicular velocity sensor 14 is disposed on a propeller shaft 4 to detect a vehicular velocity Vcar of the host vehicle by detecting a revolution speed of propeller shaft 4.

A brake pedal stroke sensor 16 is attached on a brake pedal 10 to detect a stroke (depression depth or manipulated variable) from a depressed position of brake pedal 10. In addition, an accelerator pedal stroke sensor 18 is attached on an accelerator pedal 17 to detect a stroke from the depressed position of accelerator pedal 17. These sensor signals are inputted to adaptive cruise controller 9.

Figure 2:
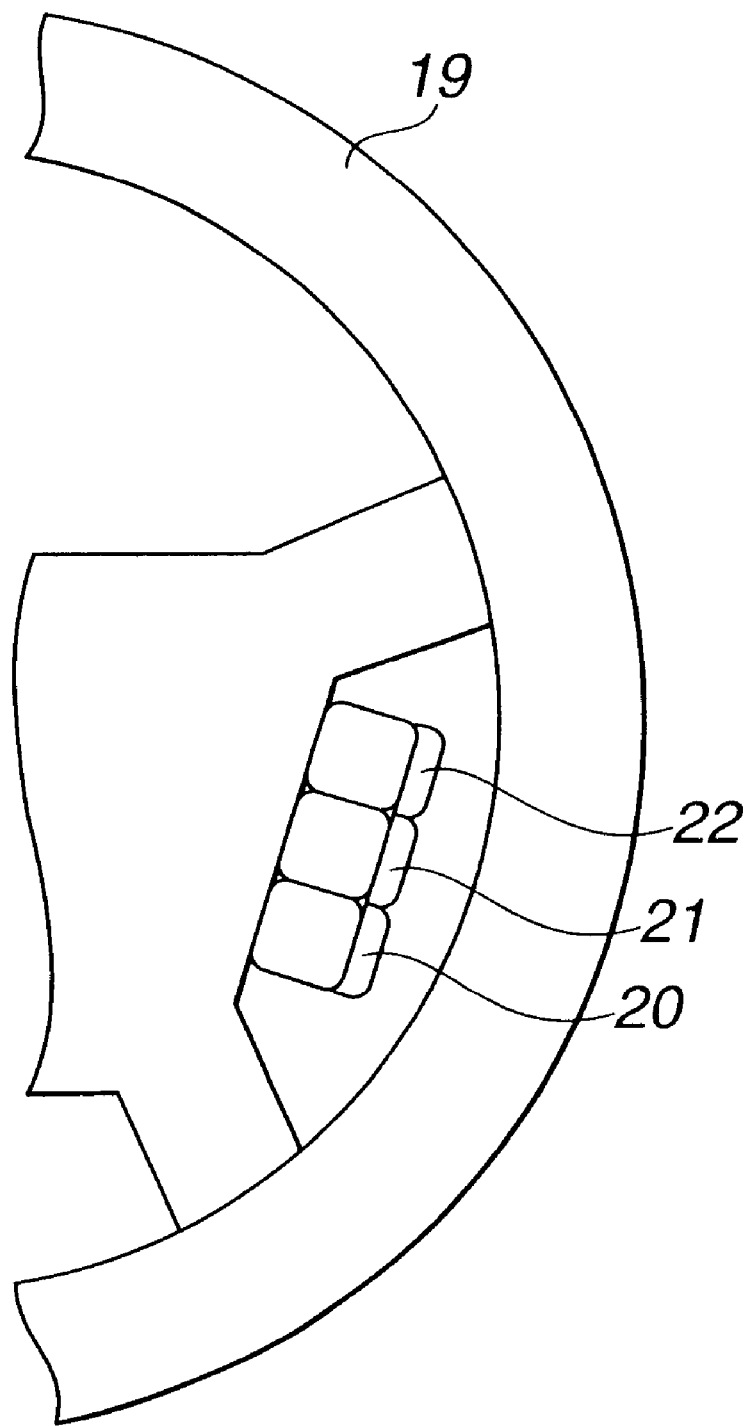
FIG. 2 is a rough configuration view of a vehicular steering wheel used in the first preferred embodiment of the vehicle velocity control apparatus shown in FIG. 1.

Furthermore, a steering wheel 19 is additionally provided with a set switch 20, a resume switch 21, both switches being installed to have the vehicle driver select whether the vehicle velocity control should be executed or not, and a cancel switch 22 to have the vehicle driver halt (stop) the vehicle velocity control, as shown in FIG. 2.

When set switch 20 is operated during a high speed run of the host vehicle, adaptive cruise controller 9 executes a first following control such as to make the velocity Vcar of the host vehicle substantially equal to a vehicle velocity at a time point at which set switch 20 has been operated when no preceding vehicle is detected to be present and to make the host vehicle follow the preceding vehicle with the vehicle velocity at the time point at which set switch 20 has been operated when the preceding vehicle is detected to be present as an upper limit of vehicle velocity of the host vehicle. Adaptive cruise controller 9 further executes a second following control such as to control the vehicle velocity of the vehicle Vcar to make the preceding vehicle follow the preceding vehicle when the preceding vehicle is detected to be present in a case where set switch 20 is operated during a low speed run. In addition, in a case where resume switch 21 is operated during the high speed run, adaptive cruise controller 9 executes the first following control at the vehicle velocity at which the first following control has previously been executed as the upper limit value. If the first following control has not been executed once and, in this state, resume switch 21 is operated, the first following control is not executed. Furthermore, in a case where set switch 20 has been operated during the execution of the first following control, the upper limit value described above is made smaller (lower). In a case where resume switch 21 has been operated, the upper limit value is made larger (higher). Adaptive cruise controller 9 includes a microcomputer and its peripheral equipment. That is to say, adaptive cruise controller 9 includes a microcomputer having a CPU (Central Processing Unit), a ROM (Read Only Memory), a RAM (Random Access Memory), an Input Port, an Output Port, a timer controller, common bus, and so forth. When a main switch of a power supply is turned on to supply a power to adaptive cruise controller 9, microcomputer within adaptive cruise controller 9 executes a calculation procedure of vehicle velocity control as shown in a flowchart of FIG. 3.

Figure 3:
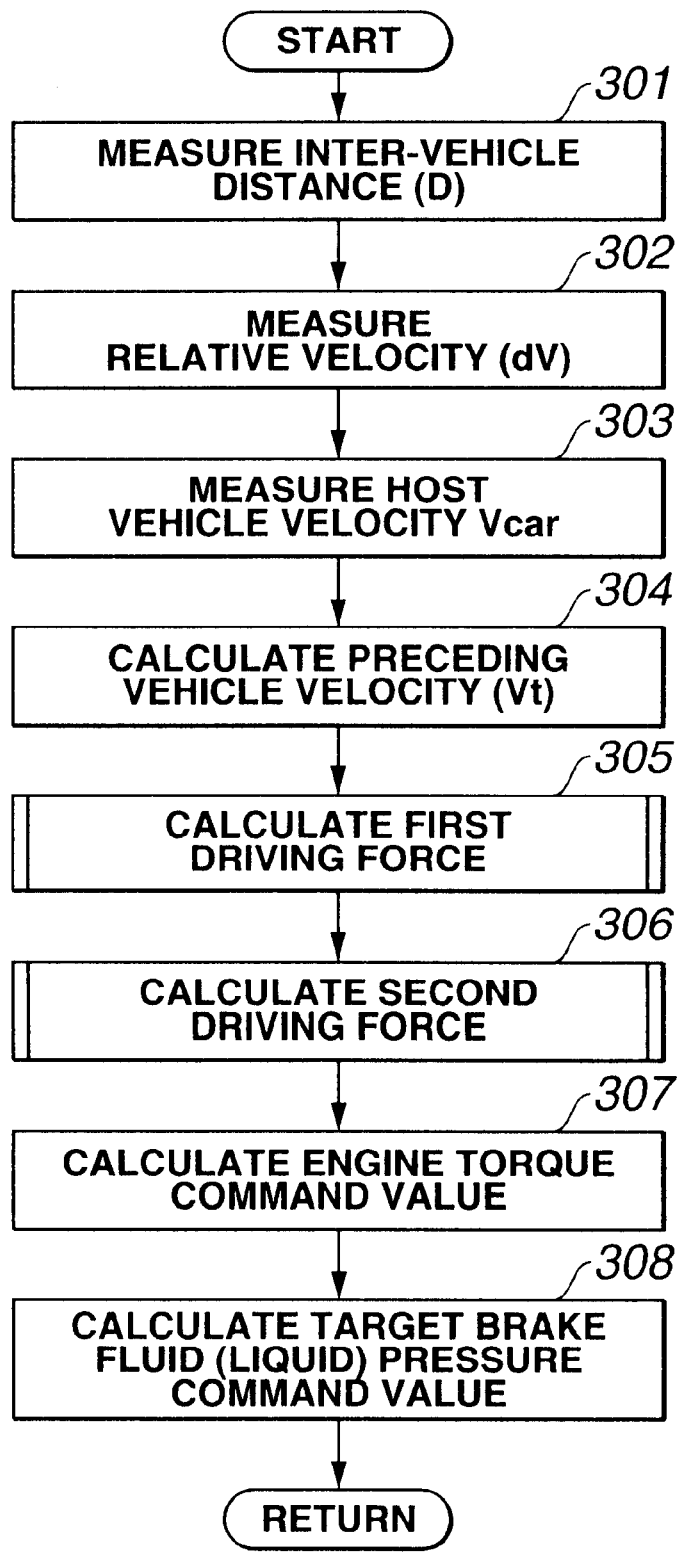
FIG. 3 is an operational flowchart of a calculation procedure of the vehicle velocity control to be executed by an adaptive cruise controller shown in FIG. 1.

FIG. 3 shows a timer interrupt routine on the vehicle velocity control which is executed whenever a predetermined control period of time $\Delta T$ (for example, 10 milliseconds) has passed as a timer interrupt routine.

In FIG. 3, at a step 301, adaptive cruise controller 9 reads an information on inter-vehicle distance D detected by inter-vehicle distance sensor 13. At the next step 302, adaptive cruise controller 9 calculates a relative velocity dV to the preceding vehicle by differentiating the inter-vehicle distance Dread at step 301. It is noted that the method of calculating relative velocity dV may be calculated by a band pass filtering (BPF) for data on inter-vehicle distance D, in place of the differentiation for inter-vehicle distance data D.

At the next step 303, adaptive cruise controller 9 reads vehicle velocity Vcar of the host vehicle detected by velocity sensor 14 and the routine goes to a step 304. At step 304, adaptive cruise controller 9 calculates a vehicle velocity $V_t$ of the preceding vehicle from the relative velocity dV between the host vehicle and the preceding vehicle and the vehicle velocity Vcar of the host vehicle. At the next step 305, adaptive cruise controller 9 executes a first driving force calculation process in accordance with a calculation process shown in FIG. 4 as will be described later and the routine goes to a step 306. It is noted that the term of driving force includes a braking force since the braking force means a minus driving force. At step 307, adaptive cruise controller 9 executes a second driving force calculation process in accordance with a calculation process shown in FIG. 5 as will be described later. Then, the routine goes to a step 307. At step 307, adaptive cruise controller 9 calculates an engine torque command value and gear shift command value on the basis of a driving force command value calculated at the first driving force calculation process and the second driving force calculation process. Then, the routine goes to a step 308. At step 308, adaptive cruise controller 9 calculates a target brake fluid (liquid) pressure on the basis of the driving force command value calculated at the first driving force calculation process or the second driving force calculation process. Then, the present interrupt routine of vehicle velocity calculation procedure is ended and returns to a main routine.

Next, a detailed explanation on the first driving force calculation process executed at step 305 will be made with reference to FIG. 4. That is to say, at a step 401, adaptive cruise controller 9 determines whether a first following control execution flag F1 indicating that the first following control is being executed is set to "1". If F1 is set to "1" (Yes), the routine goes to a step 402. If not set to "1" (No) at step 401, the routine goes to a step 408.

At step 402, adaptive cruise controller 9 determines whether vehicle velocity Vcar of the host vehicle is equal to or higher than a preset first set vehicle velocity V1 (for example, 50 Km/h). If Vcar≧V1 (Yes) at step 402, the routine goes to a step 404. If Vcar<V1 (No) at step 402, the routine goes to a step 403. At step 403, the first following execution flag F1 is reset to "0" and the subroutine in FIG. 4 is directly ended.

At step 404, adaptive cruise controller 9 determines whether set switch 20 is operated. If operated (Yes) at step 404, the routine goes to a step 405. At step 405, adaptive cruise controller 9 decrements the upper limit value of the vehicle velocity in a velocity range within which the first following control can be executed by 5 km/h (Vmax←Vmax−5 Km/h) and the routine goes to a step 414. If set switch 20 is not operated (No) at step 404, the routine goes to a step 406. At step 406, adaptive cruise controller 9 determines whether resume switch 21 is operated. If operated (Yes) at step 406, the routine goes to a step 407. At step 407, adaptive cruise controller 9 increments the upper limit value of the vehicle velocity in the velocity range within which the first following control can be executed by 5 Km/h (Vmax←Vmax+5 Km/h) and the routine goes to step 414. If No (resume switch 21 is not operated) at step 406, the routine directly goes to step 414. On the other hand, at step 408, adaptive cruise controller 9 determines whether vehicle velocity Vcar of the host vehicle is equal to or higher than the first set vehicle velocity V1. If Vcar≧V1 (Yes) at step 408, the routine goes to a step 409. If Vcar<V1 (No) at step 408, the routine shown in FIG. 4 is ended. At step 409, adaptive cruise controller 9 determines if set switch 20 is operated. If Yes (set switch 20 is operated) at step 409, the routine goes to a step 410. If No (set switch 20 is not operated) at step 409, the routine goes to a step 412. At step 410, adaptive cruise controller 9 sets vehicle velocity of host vehicle Vcar at this time point as the upper limit value of vehicle velocity Vmax (Vmax←Vcar). Then, the routine goes to a step 411.

At step 412, adaptive cruise controller 9 determines if resume switch 21 is operated. If operated (Yes) at step 412, the routine goes to a step 413. If not operated (No) at step 413, the present routine shown in FIG. 4 is ended. At step 413, adaptive cruise controller 9 determines if upper limit value of vehicle velocity Vmax remains zero which is an initial value. If Vmax is zero of the initial value (Yes) at step 413, the routine shown in FIG. 4 is ended. If No (Vmax≠0) at step 413, the routine goes to step 411. At step 411, adaptive cruise controller 9 sets first following control execution flag F1 to "1". Then, the routine goes to step 414. At step 414, adaptive cruise controller 9 determines whether the preceding vehicle is present or not. If Yes at step 414, the routine goes to a step 415. If No at step 414, the routine goes to a step 416.

At step 415, adaptive cruise controller 9 calculates a target inter-vehicle distance D* by which the host vehicle can safely follow the preceding vehicle on the basis of the relative velocity dV to the preceding vehicle and calculates the first driving force to make inter-vehicle distance D between the preceding vehicle and the host vehicle substantially equal to the target inter-vehicle distance D* in a range in which the vehicle velocity Vcar does not exceed upper limit value of vehicle velocity Vmax. Then, the first driving force calculation process shown in FIG. 4 is ended. On the other hand, at step 416, adaptive cruise controller 9 calculates the driving force to make vehicle velocity Vcar of the host vehicle substantially equal to the upper limit value of vehicle velocity Vmax. Then, the subroutine shown in FIG. 4 is ended.

Next, a detailed explanation of the second driving force calculation process executed at step 306 in FIG. 3 will be described below with reference to a detailed flowchart shown in FIG. 5.

At a step 501, adaptive cruise controller 9 determines if a second following control execution flag F2 is set to "1". If set to "1" (Yes) at step 501, the routine goes to a step 502. If not set to "1" (No) at step 501, the routine goes to a step 504. At step 502, adaptive cruise controller 9 determines if vehicle velocity Vcar of the host vehicle is equal to or lower than a preset second set vehicle velocity V2 (for example, 30 Km/h) which is lower than first set vehicle velocity V1. If Vcar≦V2 (Yes) at step 502, the routine goes to a step 507. If No (Vcar>V2) at step 502, the routine goes to a step 503. At step 503, adaptive cruise controller 9 resets second following control execution flag F2 to "0". Then, the present routine shown in FIG. 5 is ended.

On the other hand, at step 504, adaptive cruise controller 9 determines whether vehicle velocity of the vehicle Vcar is equal to or lower than preset second vehicle velocity V2. If Vcar≦V2 (Yes) at step 504, the routine goes to a step 505. If No (Vcar>V2) at step 504, the present routine shown in FIG. 5 is ended. At step 505, adaptive cruise controller 9 determines whether either set switch 20 or resume switch 21 is operated or not. If either set switch 20 or resume switch 21 is operated (Yes), the routine goes to a step 506. If neither set switch 20 nor resume switch 21 is operated (No) at step 505, the routine shown in FIG. 5 is ended. At step 506, adaptive cruise controller 9 sets second following control execution flag F2 to "1" and the routine goes to step 507.

At step 507, adaptive cruise controller 9 determines if the preceding vehicle is present. If the preceding vehicle is present (Yes) at step 507, the routine goes to a step 508. If No (no preceding vehicle is present) at step 507, the routine shown in FIG. 5 is ended.

At step 508, adaptive cruise controller 9 calculates target inter-vehicle distance D* by which the host vehicle can safely follow the preceding vehicle on the basis of the relative velocity dV to the preceding vehicle and calculates the driving force to make actual inter-vehicle distance D substantially equal to target inter-vehicle distance D* according to the result of calculation of target inter-vehicle distance D*. Then, the present routine shown in FIG. 5 is ended.

Next, using an example of the vehicle in which the vehicle velocity control apparatus in the first preferred embodiment is mounted (host vehicle) runs on a freeway, an operation of the first preferred embodiment will be described below.

First, suppose that, when the road is empty (is not crowded), no preceding vehicle is present, and the vehicle velocity Vcar falls in a velocity range equal to or higher than first set vehicle velocity V1, the vehicle driver operates set switch 20. In this case, when adaptive cruise controller 9 executes the first driving force calculation process shown in FIG. 4, at step 401, adaptive cruise controller 9 determines No. Next, at step 408, adaptive cruise controller 9 determines Yes. The, at step 409, adaptive cruise controller 9 determines that set switch 20 is operated. Then, at step 410, adaptive cruise controller 9 sets a present vehicle velocity Vcar of the host vehicle to the upper limit value of the vehicle velocity Vmax. The determination at step 414 indicates No. Then, at step 416, adaptive cruise controller 9 calculates driving force to make vehicle velocity Vcar of the host vehicle substantially equal to upper limit value of vehicle velocity Vmax. On the other hand, at the second driving force calculation process shown in FIG. 5, the routine goes to step 501 which indicates No and the routine goes to step 504 which indicates No. Hence, the second driving force calculation process shown in FIG. 5 is ended without the calculation of the driving force. Hence, in the above-described case, the first driving force control described above is executed and the first following control described above is executed.

Next, suppose that the freeway on which the host vehicle is running is started to be crowded while the host vehicle makes a cruise speed run at upper limit value of the vehicle velocity Vmax and the preceding vehicle has appeared in the forward direction of the host vehicle. In this case, a determination at step 414 indicates Yes and adaptive cruise controller 9 calculates driving force according to which the host vehicle can safely follow the preceding vehicle. Furthermore, the freeway becomes crowded during the following run after the preceding vehicle and vehicle velocity of the host vehicle Vcar is largely decreased and becomes lower than the first set vehicle velocity V1. At this time, since the determination at step 401 indicates Yes and the determination at step 402 indicates No, the first driving force calculation process shown in FIG. 4 is ended without the calculation of the driving force and the first following control is stopped.

As described above, since the first following control is stopped when vehicle velocity Vcar of host vehicle becomes lower than first set vehicle velocity V1, the driver can accurately determine which of the following controls is executed only by confirming vehicle velocity Vcar at a time of the execution of control through a speedometer of an instrument panel of the host vehicle and can accurately recognize that velocity Vcar of the host vehicle falls out of a speed region in which the first following control can be carried out by the stop of the control.

As shown in FIGS. 6A through 6D, suppose, further, that set switch 20 is operated before vehicle velocity Vcar of the host vehicle is made equal to or lower than second set vehicle velocity V2 in order for the vehicle driver to try to start the second following control. In this case, at the second driving force calculation process shown in FIG. 5, the determination at step 501 indicates No and determination at step 504 indicates No. Since second driving force calculation process shown in FIG. 5 is ended without determination of whether the set switch 20 is operated, the second following control is not started.

Thereafter, suppose that vehicle velocity of host vehicle Vcar is lowered and becomes equal to or lower than second set vehicle velocity V2 and, then, the driver operates again set switch 20, as shown in FIGS. 6A through 6D. In this case, at the second driving force calculation process, the determination at step 501 in FIG. 5 indicates No and the determination at step 504 indicates Yes. The determination at step 505 indicates Yes. Then, the routine goes to step 506 and goes to step 507. The determination at step 507 indicates Yes and the routine goes to step 508 at which adaptive cruise controller 9 calculates the driving force according to which the host vehicle can safely follow the preceding vehicle. On the other hand, at the first driving force calculation process shown in FIG. 4, the determination at step 401 indicates No and the determination at step 508 indicates No. Thus, the calculation process is ended without calculation of the first driving force. Hence, the second driving force control is executed and the second following control is started.

As described above, the first following control can be started when vehicle velocity Vcar falls within the range of velocity equal to or higher than first set vehicle velocity V1. The second following control can be started when velocity Vcar of the host vehicle falls within the range of velocity equal to or lower than second set vehicle velocity V2. Hence, the driver can accurately determine which of the following controls is being executed by recognizing vehicle velocity Vcar of the host vehicle when the control is started through the speedometer.

Furthermore, in the first embodiment, the second set vehicle velocity V2 is preset to a vehicle velocity lower than first set vehicle velocity V1. In other words, since the velocity range (so-called, a dead zone) in which the control cannot be executed between two preset vehicle velocities V2 and V1, the driver can clearly determine the switched state between the two following controls.

In addition, suppose that, while the host vehicle follows the preceding vehicle, the congestion of the freeway is eliminated and the driver operates accelerator pedal 17 so that the velocity Vcar of the vehicle is higher than second set vehicle velocity V2. At this time, the determination at step 501 indicates Yes. The determination at step 502 indicates No. Hence, the second driving force calculation process shown in FIG. 5 is ended without calculation of the driving force. Then, the second following control is ended. As described above, since the second following control is stopped when velocity of the vehicle Vcar becomes higher than second set vehicle velocity V2, the second following control is stopped. Hence, the vehicle driver can accurately determine which of the following controls is executed by recognizing the velocity Vcar of the host vehicle at a time at which the control is being executed through the speedometer and that velocity of the host vehicle Vcar falls out of the second following control range by the stop of the control.

As shown in FIGS. 7A through 7D, suppose that the driver operates set switch 20 before the velocity of the vehicle Vcar becomes equal to or higher than first set vehicle velocity V1 in order to try to start the first following control. At this time, the determination at step 401 indicates No and the determination at step 408 indicates No. Since the second driving force calculation process is ended without determination of whether set switch 20 is operated, the first following control is not started. Furthermore, suppose that with the velocity Vcar of the host vehicle is equal to or higher than first set vehicle velocity V1, the driver again operates set switch 20, as shown in FIGS. 7A through 7D. At this time, the driving force is calculated and the first following control is restarted.

In the first embodiment, vehicle velocity sensor 14 corresponds to vehicle velocity Vcar detecting means, radar unit 13 corresponds to preceding vehicle detecting means, adaptive cruise controller 9 and steps 401 through 416 correspond to first following vehicular velocity controlling means, and adaptive cruise controller 9 and steps 401 through 416 corresponds to first following controlling means, adaptive cruise controller 9 and steps 501 through 508 correspond to second following controlling means, set switch 20 or resume switch 21 corresponds to first following control start requesting means, adaptive cruise controller 9 and steps 409 and 412 correspond to first request allowing means, step 402 corresponds to first following control stopping means, and step 502 corresponds to second following control stopping means.

Next, a second preferred embodiment of the vehicle velocity control apparatus according to the present invention will be described below.

In the second preferred embodiment, during a predetermined period of time from a time at which the first following control is stopped, the second following control is not started even if set switch 20 is operated. In this respect, the second preferred embodiment is different from the first preferred embodiment.

Figure 4:
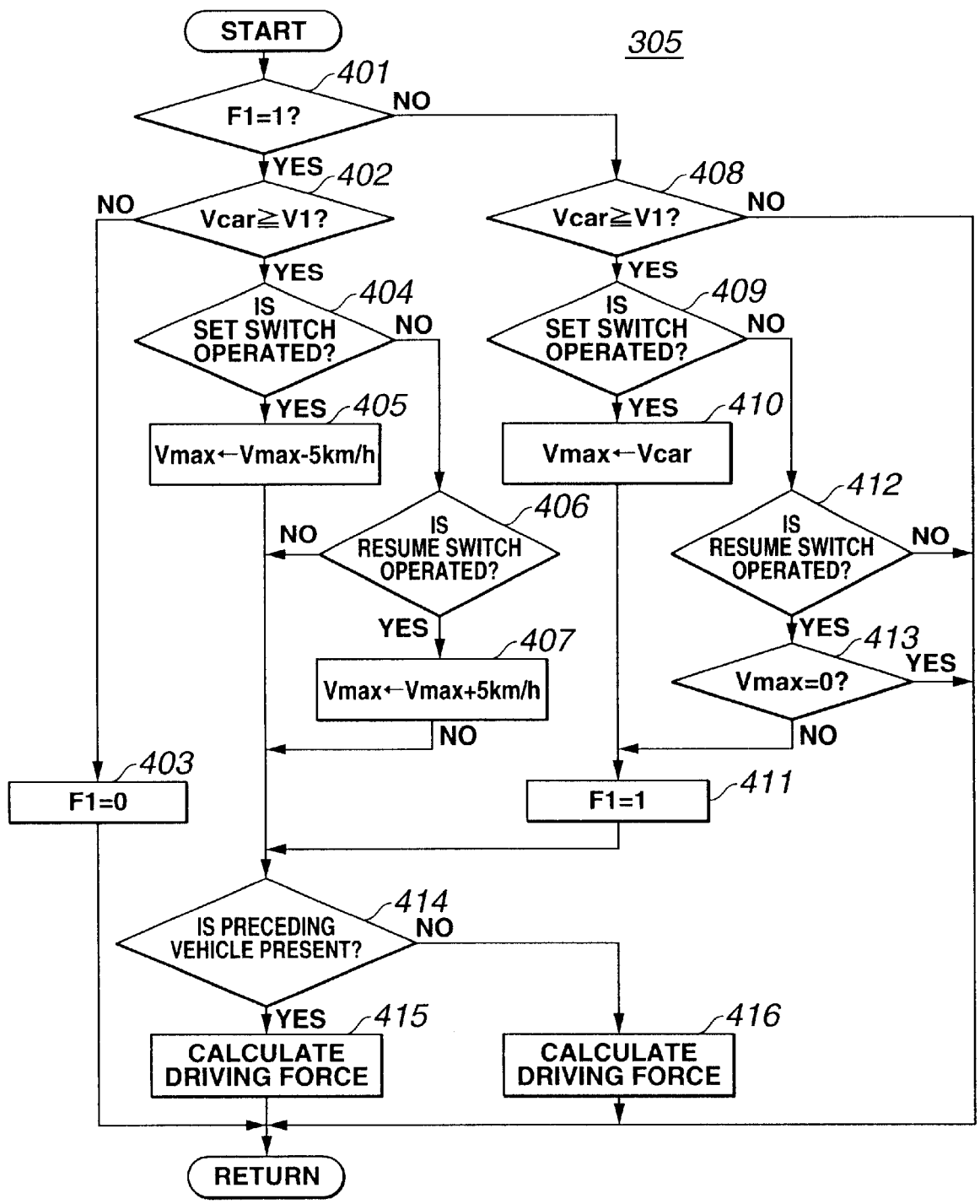
FIG. 4 is a detailed flowchart of a first driving force calculation process to be executed in the calculation procedure shown in FIG. 3.
Figure 8:
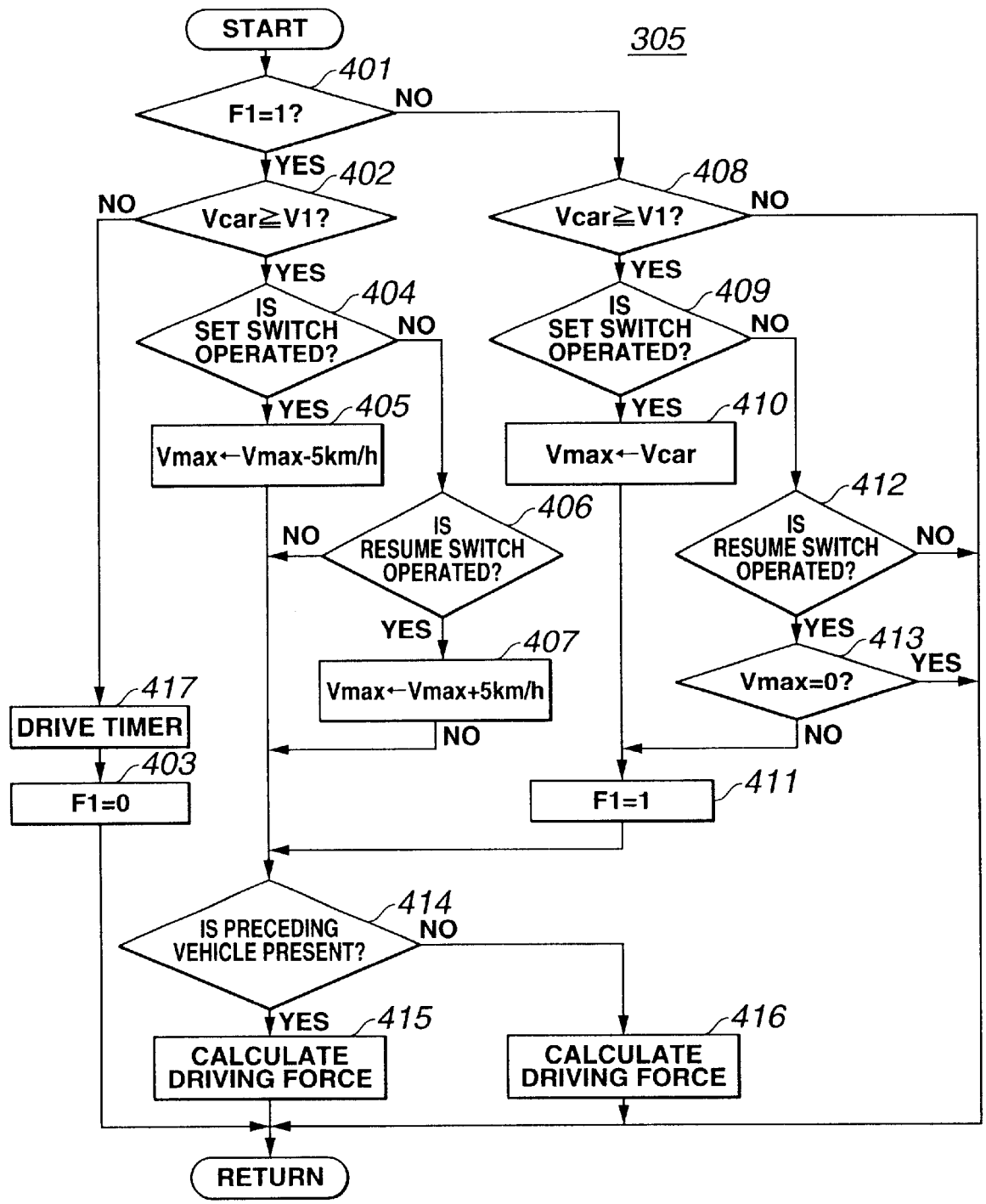
FIG. 8 is a detailed flowchart of the first driving force calculation process corresponding to FIG. 4 and which is executed by the adaptive cruise controller in a case of a second preferred embodiment of the vehicle velocity control apparatus according to the present invention
Figure 9:
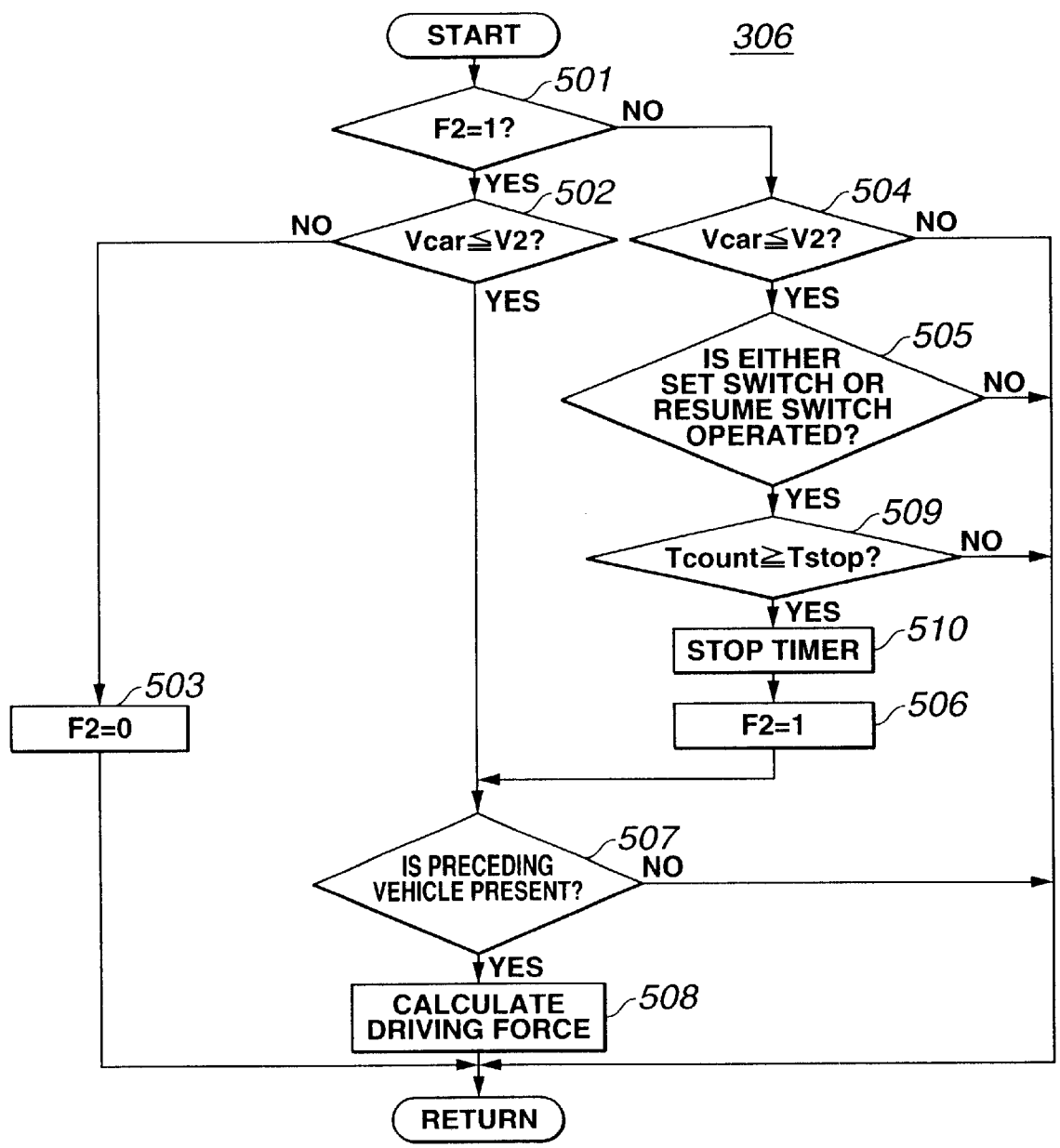
FIG. 9 is a detailed flowchart of the second driving force calculation process corresponding to FIG. 5 and which is executed by the adaptive cruise controller in a case of the second preferred embodiment according to the present invention.
Figures 10A, 10B, 10C, 10D:
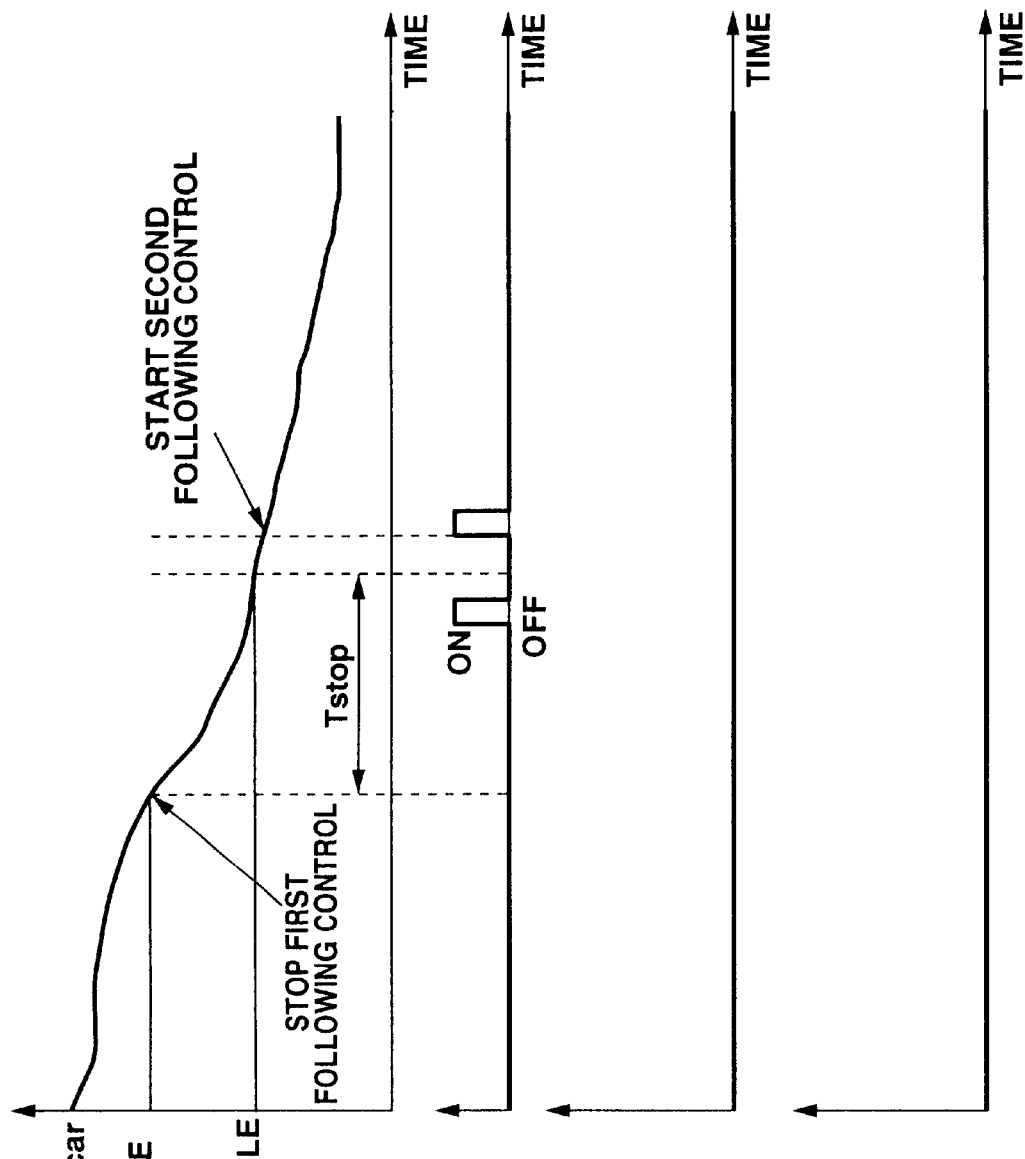
FIGS. 10A, 10B, 10C, and 10D are characteristic graphs for explaining an operation of the vehicle velocity control apparatus in the case of the second preferred embodiment.

That is to say, in the second embodiment, a step 417 at which a timer operated in a background job is activated is interposed between steps 402 and 403 shown in FIG. 4 in the first embodiment, as shown in FIG. 8. In addition, a step 509 is interposed between steps 505 and 506 shown in FIG. 5 of the first preferred embodiment, as shown in FIG. 9. At step 509, adaptive cruise controller 9 determines if an operation time duration Tcount of the timer is equal to or longer than a predetermined time duration Tstop. a step 510 is subsequently passed from step 509. At step 510, if the result of determination is Tcount≧Tstop at step 509, adaptive cruise controller 9 stops the timer and, the result of determination is Tcount<Tstop at step 509, the routine shown in FIG. 9 is directly ended. Except steps 417, 509, and 510, the same processes as those described in the first embodiment are executed in the second embodiment. It is noted that the same numbered steps shown in FIGS. 8 and 9 as those shown in FIGS. 4 and 5 execute the like processes and the detailed explanation thereof will herein be omitted.

Next, suppose, as an example, that the host vehicle in which the vehicle velocity control apparatus is mounted is running on the freeway. A specific operation of the second embodiment will be described in details below.

Suppose that a road on which the host vehicle is running to follow the preceding vehicle in the first following control and, then, the road becomes crowded so that, as shown in FIGS. 10A through 10D, vehicle velocity Vcar of the host vehicle is greatly decreased (decelerated) and vehicle velocity of the host vehicle Vcar becomes equal to or lower than the first set vehicle velocity V1. In this case, the determination at step 401 indicates Yes and the determination of step 402 indicates No so that the timer is activated at step 417. Thereafter, the first following control execution flag F1 is reset to "0" so as to stop the first following control.

Then, as shown in FIGS. 10A through 10D, suppose that, after velocity of the host vehicle Vcar becomes equal to or lower than second set vehicle velocity V2, set switch 20 is operated by the driver to try to start the second following control before operation time duration Tcount becomes equal to the predetermined time duration Tstop. In this case, in the second driving force calculation process shown in FIG. 9, the determination at step 501 indicates No. In addition, each of the determinations at steps 504 and 505 indicates Yes. However, since Tcount<Tstop, determination at step 509 indicates No and the second driving force calculation process is ended without a determination of whether set switch 20 is operated. Hence, no second following control is started.

Thereafter, suppose that the time has furthermore elapsed and the driver again operates set switch 20 after the timer operation time duration Tcount becomes equal to or longer than the predetermined time duration Tstop, as shown in FIGS. 10A through 10D. Then, the determination at step 509 indicates Yes and the driving force to enable for the host vehicle to safely follow the preceding vehicle is calculated at step 508. Then, the second following control is started.

As described above, for predetermined period of time Tstop upon the stop of the first following control, the second following control is set to be not started. Hence, even if velocity of the host vehicle Vcar falls in the range from the velocity value equal to or higher than first set vehicle velocity V1 to the velocity value equal to or lower than second set vehicle velocity V2 under a state wherein the driver is not aware of that effect, the second following control is not immediately executed. This permits the driver to accurately determine which of the two following controls is being executed. It is noted that, in the second embodiment, steps 505 and 509 correspond to second request allowing means.

Next, a third preferred embodiment of the vehicle velocity control apparatus according to the present invention will be described below. A difference point of the third embodiment from the second embodiment described above is that, when vehicle velocity Vcar of the host vehicle due to a deceleration manipulation by the driver after the first following control is stopped is made equal to or lower than second set vehicle velocity V2, the second following control can be started even if predetermined time duration of Tstop is not elapsed.

Figure 11:
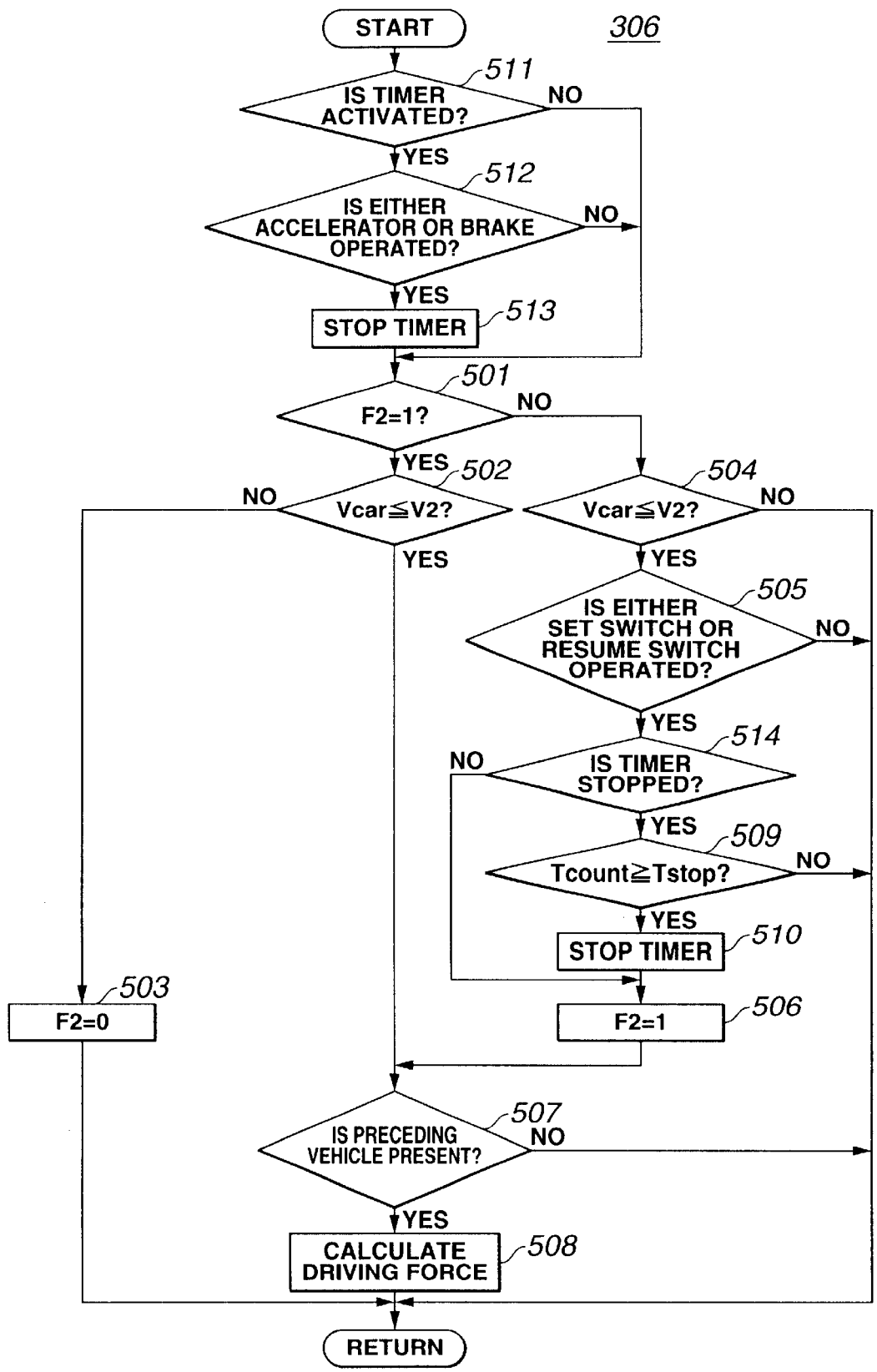
FIG. 11 is a detailed flowchart of the first driving force calculation process executed by adaptive cruise controller and corresponding to FIG. 9 in a case of a third preferred embodiment of the vehicle velocity control apparatus according to the present invention.
Figures 12A, 12B, 12C, 12D:
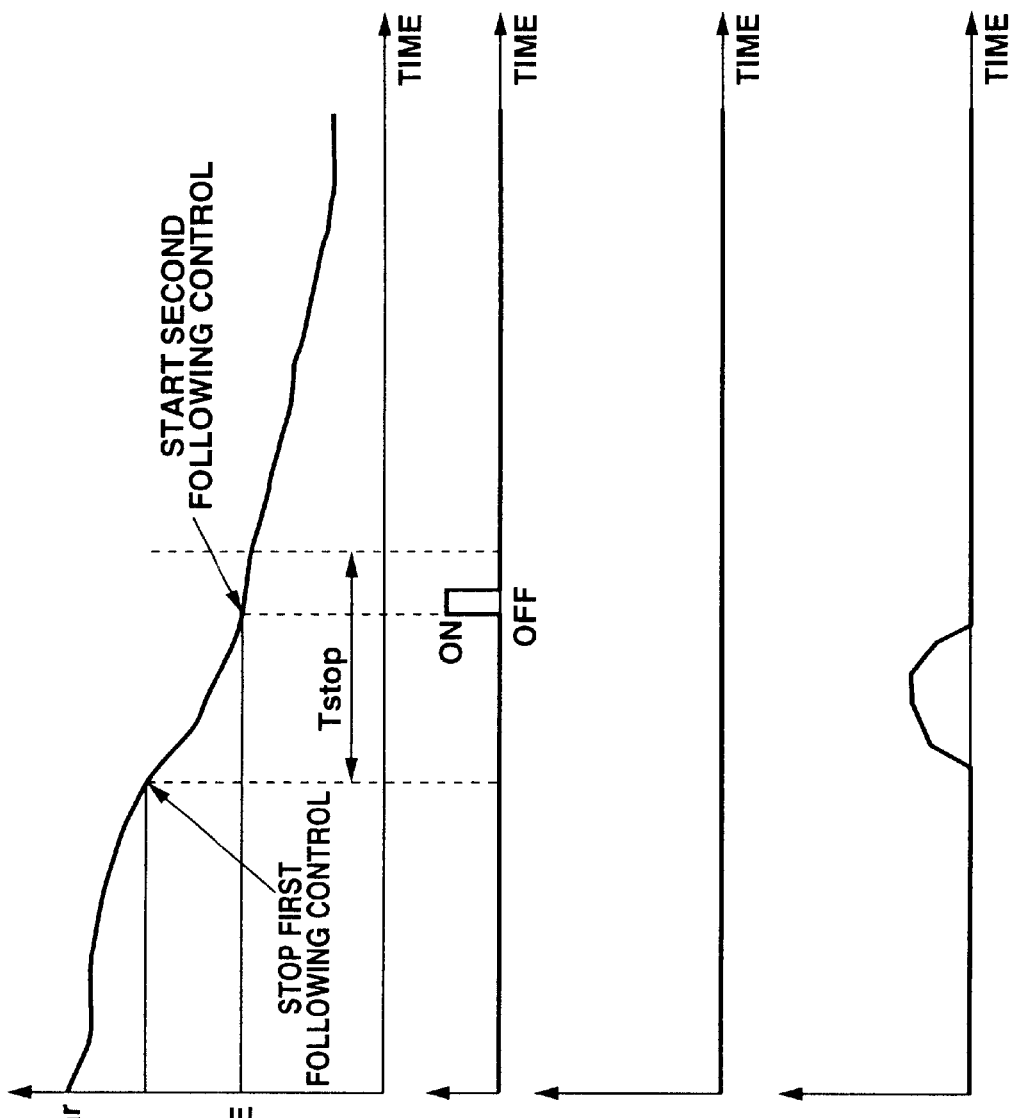
FIGS. 12A, 12B, 12C, and 12D are characteristic graphs for explaining an operation of the third preferred embodiment of the vehicle velocity control apparatus according to the present invention.

In details, in the third embodiment, as shown in FIG. 11, four steps of steps 511, 512, 513, and 514 are added to the calculation process shown in FIG. 9 described in the second embodiment from among the processes executed in adaptive cruise controller 9. That is to say, at step 511 which is located before step 501, adaptive cruise controller 9 determines if the timer is being activated and the routine goes from step 511 to step 501 if determining that the timer is not activated (No at step 511). The routine goes to step 512 if adaptive cruise controller 9 determines that the timer is being activated (Yes at step 511). At step 512, adaptive cruise controller 9 determines if either accelerator pedal 17 or brake pedal 10 has been operated according to results of detections from both of brake pedal stroke sensor 16 and accelerator pedal stroke sensor 18. If neither brake pedal 10 nor accelerator pedal 17 is operated (No) at step 512, the routine goes to step 501. If either accelerator pedal 17 or brake pedal 10 is operated (Yes) at step 512, the routine goes to step 513 at which the timer is stopped. Step 514 is interposed between steps 505 and 509 to determine if the timer is stopped. If the timer is stopped at step 514, the routine goes to step 506. If No at step 514, the routine goes to step 509. Except the above-described steps 511 through 514, the same processes as those described in the second embodiment is carried out in the third embodiment. The same processes as those shown in FIG. 9 have the like step numbers and the detailed description thereof will herein be omitted.

Next, suppose, for example, that the host vehicle in which the vehicle velocity control apparatus in the third embodiment is mounted runs on the freeway. Using this example, the specific operation of the third embodiment will be described in details.

Suppose that, during the following run to the preceding vehicle in the first following control, the road becomes congested so that the preceding vehicle is largely decelerated, the host vehicle is accordingly decelerated so that the vehicle velocity of the host vehicle Vcar becomes equal to or lower than first set vehicle velocity V1, and, at the same time when the first following control is stopped, the timer is activated.

As shown in FIGS. 12A through 12D, suppose that vehicle velocity of the host vehicle Vcar becomes equal to or lower than second set vehicle velocity V2 due to the brake manipulation by the driver and, thereafter, set switch 20 is operated before the operation time duration of the timer Tcount reaches to predetermined time duration Tstop. In this case, at the second driving force calculation process shown in FIG. 11, the determination at step 511 indicates Yes, a determination of step 514 indicates Yes, and, at step 513, the timer is stopped. Then, the determination at step 514 indicates Yes so that the routine jumps over step 509 to determine if the timer operation time duration Tcount is equal to or longer than the predetermined time duration Tstop. At step 508, adaptive cruise controller 9 calculates the driving force according to which the host vehicle can safely follow the preceding vehicle and the second following control is started.

As described above, after the first following control is stopped, the second following control can be started when the driver manually decelerates the host vehicle so that vehicle velocity of the host vehicle Vcar becomes equal to or lower than second set vehicle velocity V2. Therefore, when vehicle velocity of the host vehicle Vcar is reduced so as to intentionally make velocity of the host vehicle Vcar equal to or lower than set vehicle velocity V2 by the manipulation of the vehicular brake by the driver, the second following control can immediately be started. Hence, a vehicular convenience can be improved.

It is noted that, in the third embodiment, brake pedal stroke sensor 16 corresponds to deceleration manipulation detecting means and steps 505 and 514 correspond to second request allowing means.

Next, a fourth preferred embodiment of the vehicle velocity control apparatus according to the present invention will be described below.

Figure 5:
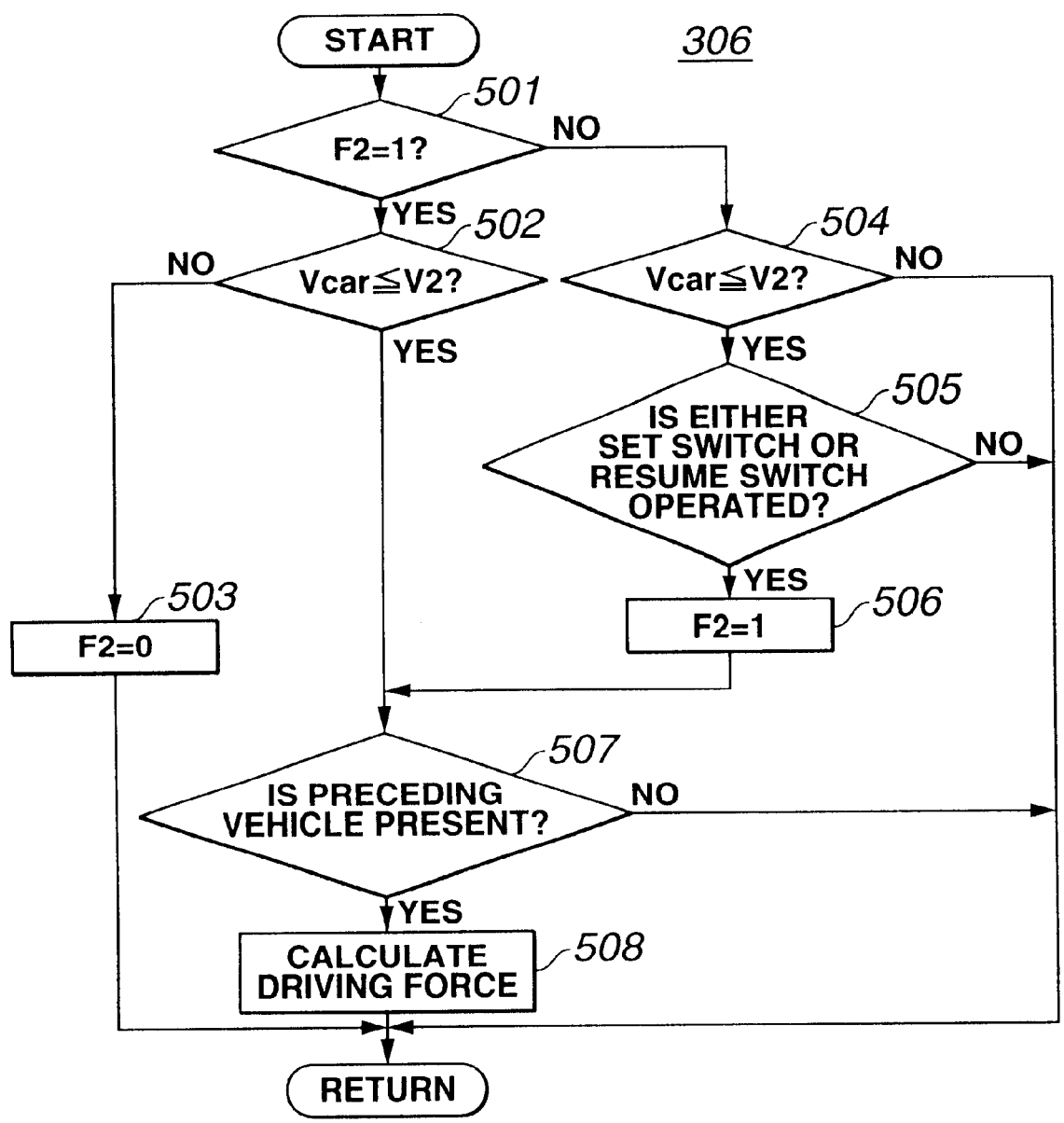
FIG. 5 is a detailed flowchart of a second driving force calculation process to be executed in the calculation procedure shown in FIG. 3.
Figure 6:
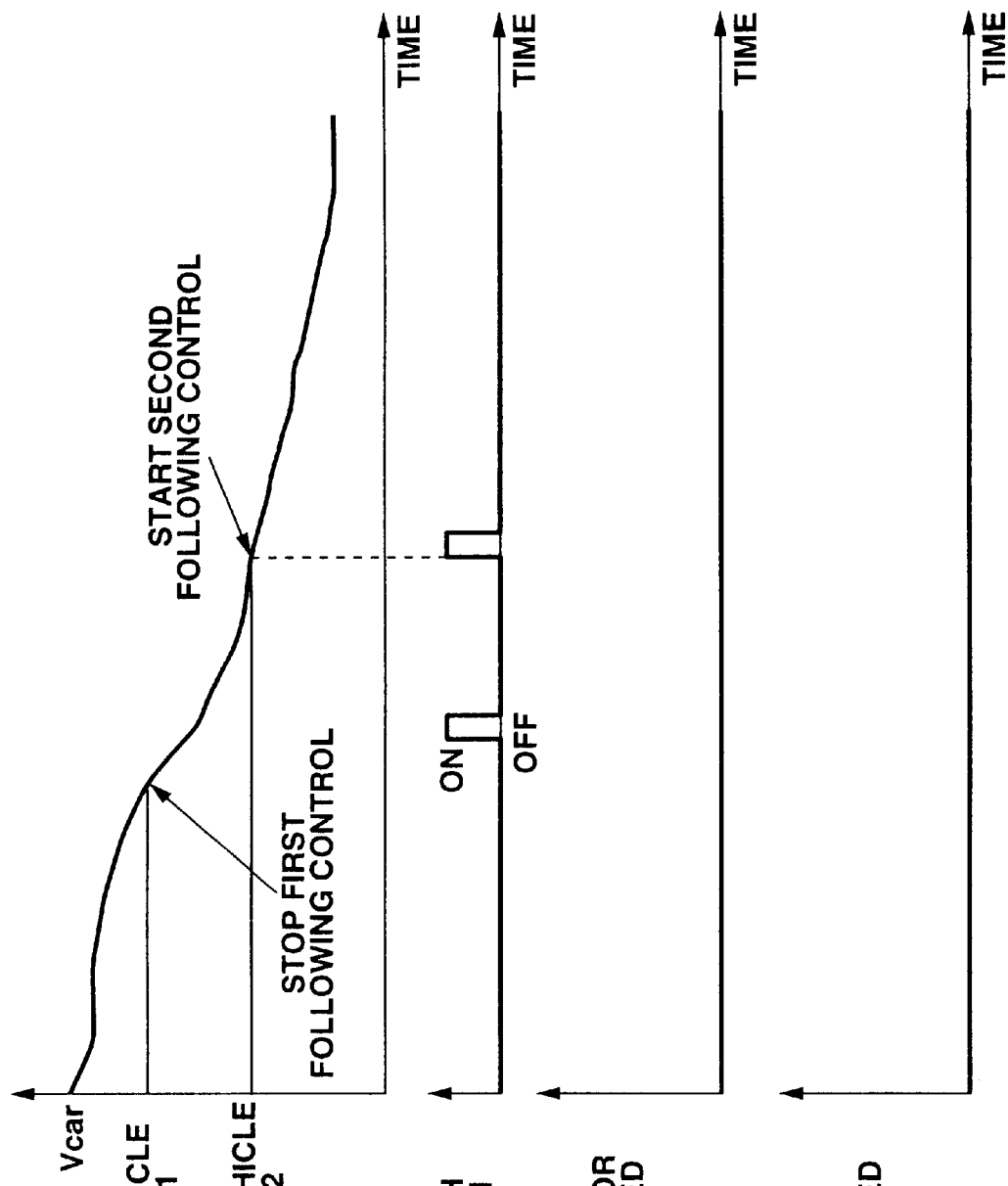
FIGS. 6A, 6B, 6C, and 6D are characteristic graphs for explaining an operation of the first preferred embodiment of the vehicle velocity control apparatus according to the present invention.
Figure 7:
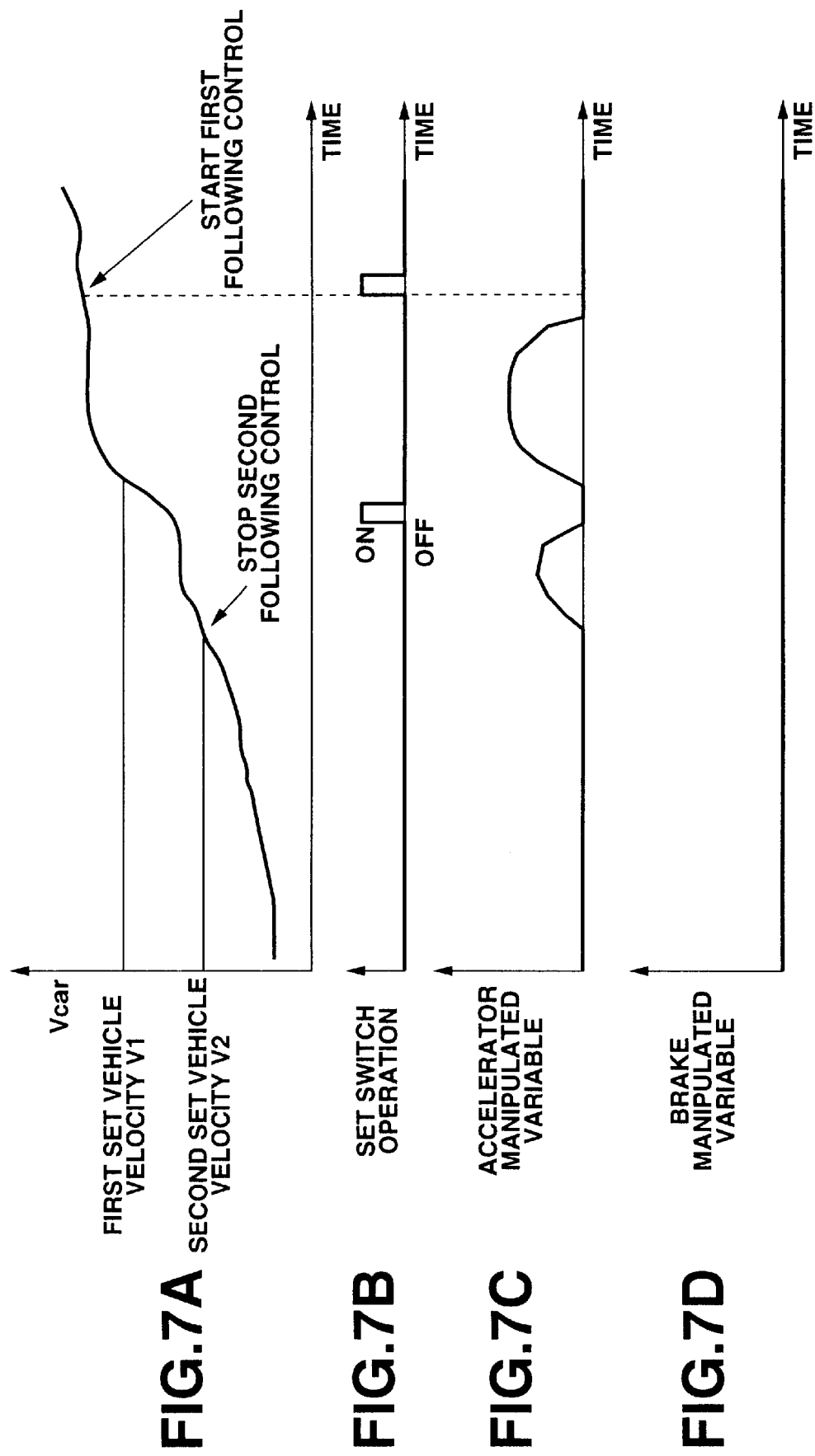
FIGS. 7A, 7B, 7C, and 7D are characteristic graphs for explaining the operation of the first preferred embodiment of the vehicle velocity control apparatus according to the present invention.
Figure 14:
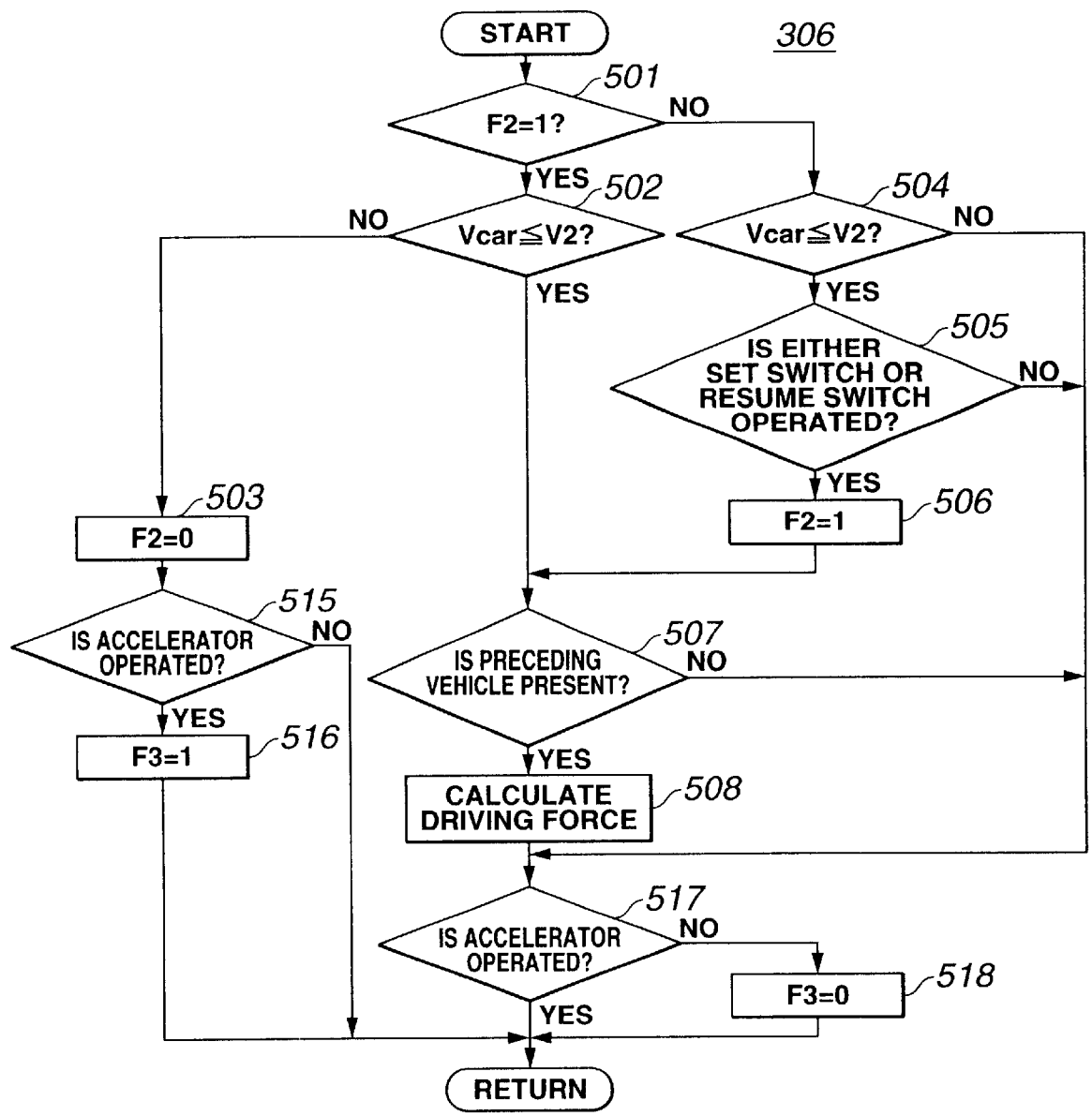
FIG. 14 is a detailed flowchart of the second driving force calculation process executed by the adaptive cruise controller and which corresponds to FIG. 5 in the case of the fourth preferred embodiment according to the present invention.
Figures 17A, 17B, 17C, 17D:
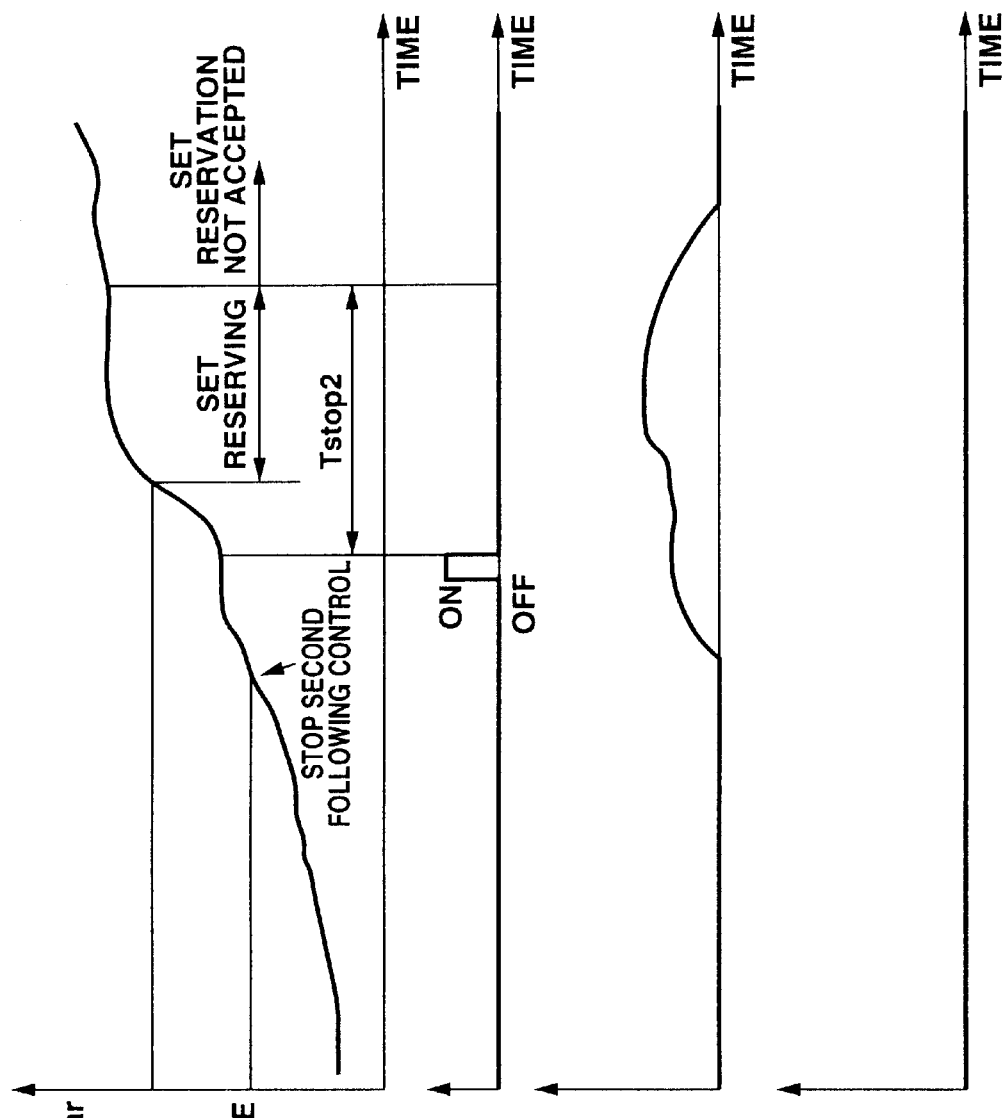
FIGS. 17A, 17B, 17C, and 17D are characteristic graphs for explaining an operation of the fifth preferred embodiment according to the present invention.

Difference points of the fourth preferred embodiment from the first embodiment are that, as shown in FIG. 13 which corresponds to the first driving force calculation process of FIG. 4 described in the first embodiment, seven steps of steps 418, 419, 420, 421, 422, 423, and 424 are added and, as shown in FIG. 14 which corresponds to the calculation process of FIG. 5 described in the first embodiment, four steps of 515, 516, 517, and 518 are added. In details, at step 418 shown in FIG. 13, adaptive cruise controller 9 determines if set switch 20 is operated when vehicle velocity of the host vehicle Vcar is lower than first set vehicle velocity V1 at step 408 shown in FIG. 4. At step 419, adaptive cruise controller 9 determines if resume switch 21 is operated when determining that set switch 20 is not operated at step 418. If adaptive cruise controller 9 determines that resume switch 21 is not operated (No), at step 419, the first driving force calculation process shown in FIG. 13 is ended. If resume switch 21 is operated at step 419 (Yes), the routine goes to step 420. At step 420, adaptive cruise controller 9 determines if upper limit value of vehicle velocity Vmax remains zero which is the initial value thereof. If Vmax=0 at step 420 (Yes), the first driving force calculation process shown in FIG. 13 is ended. At step 421, adaptive cruise controller 9 determines whether a temporary acceleration high cut flag F3 is set to "1" representing that the accelerator pedal 17 is continuously operated from a time at which the second driving force calculation process is being executed when set switch 20 is determined to be operated at step 418 (Yes). If flag F3 is not set to "1" at step 421 (No), the first driving force calculation process shown in FIG. 13 is ended. If adaptive cruise controller 9 determines that temporary acceleration high cut flag F3 is set to "1" at step 421 (Yes), adaptive cruise controller 9 sets a reservation flag F4 to "1" representing that the first following control is to be started at a time point at which the driver ends the manipulation of accelerator pedal 17 if temporary acceleration high cut flag F3 is set to "1" at step 422. If resume switch 21 is determined to be not operated at step 412 (No) or adaptive cruise controller 9 determines that upper limit value of vehicle velocity Vmax is kept at the initial value of zero at step 413 (Yes), adaptive cruise controller 9 determines, at step 423, whether temporary acceleration high cut flag F3 is changed from the set state of "1" to the reset state of "0". If flag F3 is not changed from "1" to "0" at step 423 (No), the first driving force calculation process shown in FIG. 13 is ended. On the other hand, if flag F3 is changed from "1" to "0" at step 423 (Yes), the routine goes from step 423 to step 424 at which adaptive cruise controller 9 determines if reservation flag F4 is set to "1". If flag F4 is set to "1" (Yes) at step 424, the routine goes to step 414. If flag F4 is not set to "1" (No) at step 424, the first driving force calculation process shown in FIG. 13 is ended.

Next, as far as FIG. 14 is concerned, at step 515, adaptive cruise controller 9 determines if accelerator pedal 17 is depressed by driver according to a result of detection from accelerator pedal stroke sensor 18. If accelerator pedal 17 is not operated (No) at step 515, the second driving force calculation process shown in FIG. 14 is ended. If accelerator pedal 17 is operated (Yes) at step 515, the routine goes to step 516 at which temporary acceleration high cut flag F3 is set to "1". Furthermore, step 517 is provided at which adaptive cruise controller 9 determines if the driver operates accelerator pedal 17 after step 508. If accelerator pedal 17 is operated at step 517, the second driving force calculation process is ended. If, at step 517, adaptive cruise controller 9 determines that accelerator pedal 17 is not operated (No), the routine goes to step 518. At step 518, adaptive cruise controller 9 resets temporary acceleration high cut flag F3 to "0". Except the above-described new steps, the same processes as those shown in FIGS. 4 and 5 described in the first embodiment are carried out, in the fourth embodiment. It is noted that the same processes in FIGS. 13 and 14 as those shown in FIGS. 4 and 5 have the like step numbers and the detailed description thereof will herein be omitted.

Next, a specific operation of the fourth preferred embodiment will be described below in details using an example in which the host vehicle in which the vehicle velocity control apparatus in the fourth preferred embodiment is mounted is running on the freeway.

First, suppose that, while the host vehicle is running on the freeway to follow the preceding vehicle in the second following control, the road becomes empty (not crowded) and, as the result of operation by the driver on accelerator pedal 17 to accelerate vehicle velocity of the host vehicle, vehicle velocity Vcar of the host vehicle is in excess of second set vehicle velocity V2. In this case, at the second driving force calculation process shown in FIG. 14, the determination at step 501 indicates Yes since the second following control has previously been executed. The determination at step 502 indicates No since vehicle velocity of the host vehicle Vcar is in excess of second set vehicle velocity V2. In addition, after second following control execution flag F2 is reset to "0" at step 503, the determination at step 515 indicates Yes since accelerator pedal 17 is operated (depressed) and temporary acceleration high cut flag F3 is set to "1" at step 516. Then, since second driving force calculation process is ended, the second following control is ended.

Suppose, then, that, as shown in FIGS. 15A through 15D, the driver operates set switch 20 before vehicle velocity of the host vehicle Vcar becomes equal to or higher than first set vehicle velocity V1 to try to start the first following control by the driver. At this time, since the first following control is not yet started, at the first driving force calculation process shown in FIG. 13, the determination at step 401 indicates No. Since vehicle velocity of the host vehicle Vcar does not reach to first set vehicle velocity V1, the determination at step 408 indicates No. Furthermore, since set switch 20 is operated, the determination at step 408 indicates Yes. Since temporary acceleration high cut flag F3 is set to "1" in the second driving force calculation process, the determination at step 421 indicates Yes. At step 422, reservation flag F4 is set to "1". Then, the first driving force calculation process shown in FIG. 13 is ended. Hence, the first following control is not started.

Then, suppose that, when vehicle velocity of the host vehicle Vcar becomes equal to or higher than first set vehicle velocity V1, the driver ends the operation of accelerator pedal 17. At this time, the determination at step 408 indicates Yes. Since a new operation of either set switch 20 or resume switch 21 is not found, each of the determinations of steps 409 and 412 indicates No. Since the operation on accelerator pedal 17 is ended, the determination at step 423 indicates Yes without determination of whether set switch 20 is operated. In addition, since reservation flag F4 is already set to "1", the determination at step 423 indicates Yes. The driving force is calculated according to which the host vehicle can safely follow the preceding vehicle at step 415. Then, the first following control is started.

As described above, since, when set switch 20 or resume switch 21 is operated during the acceleration operation by driver, the acceleration operation is ended with the vehicle velocity of host vehicle Vcar falls in a speed range equal to or higher than first set vehicle velocity V1, the first following control is started. Hence, when driver has tried to operate accelerator pedal 17 so as to increase vehicle velocity of the host vehicle intentionally so that vehicle velocity of the host vehicle Vcar becomes equal to or higher than first set vehicle velocity V1. At this time, the first following control is immediately started and the vehicular convenience can be improved. It is noted that, in the fourth embodiment, accelerator pedal stroke sensor 18 corresponds to acceleration operation detecting means and steps 409, 412, 423, and 424 corresponds to first request allowing means.

Next, a fifth preferred embodiment of the vehicle velocity control apparatus according to the present invention will be described below. In the fifth embodiment, a difference point from the fourth embodiment is that, when set switch 20 or resume switch 21 is operated with the driver's acceleration operation, the first following control is not started if the above-described acceleration operation is continued for a predetermined time duration from a time point at which the operation of set switch 20 or resume switch 21 is started.

In details, in the fifth embodiment, two steps of 425 and 426 are added to the first driving force calculation process shown in FIG. 13 described in the fourth preferred embodiment, as shown in FIG. 16. That is to say, step 425 is provided at which a second timer to measure an elapsed time from a time at which the accelerator operation is detected from accelerator pedal stroke sensor 18 after step 422 described in FIG. 13 in the fourth embodiment, as shown in FIG. 16. In addition, if reservation flag F4 is determined to be not in the set state at step 424, the routine goes to step 426 at which adaptive cruise controller 9 determines whether a second timer operation time duration Tcount2 is equal to or longer than a predetermined time duration of Tstop2. If Tcount2≧Tstop2 at step 426 (Yes), the routine goes to step 414. If Tcount2<Tstop2 at step 426 (No), the routine on the first driving force calculation process shown in FIG. 16 is ended. The other steps are the same as those described in the fourth preferred embodiment. It is noted that the detailed description on the same step numbered steps in FIG. 16 as those in FIG. 13 described in the fourth embodiment will herein be omitted.

Next, a specific operation of the fifth preferred embodiment of the vehicle velocity control apparatus will be described below using the example in which the host vehicle in which the apparatus in the fifth embodiment is mounted is running on the freeway.

As shown in FIGS. 17A, 17B, 17C, and 17D, suppose that the driver of the host vehicle operates accelerator pedal 17 to accelerate the host vehicle from a state in which the host vehicle is following the preceding vehicle in the second following control and operates set switch 20 in order to start the first following control before the vehicle velocity of the host vehicle Vcar becomes equal to or higher than first set vehicle velocity V1. In this case, in the same manner as in the case of the fourth embodiment, in the second driving force calculation procedure, the routine goes to the following route: steps 501→502→503→515→516 so that second following control execution flag F2 is reset to "0", temporary acceleration high cut flag F3 is set to "1", and the second following control is ended. At the first driving force calculation process, the following steps is advanced: steps 401→408→419→421→422 so that reservation flag F4 is set to "1" and, thereafter, the second timer is started to be activated at step 425. Then, suppose that, when the acceleration operation is taken for predetermined time duration Tstop2 from the time at which the driver operates set switch 20 and the driver has forgotten to operate set switch 20, vehicle velocity of the host vehicle Vcar becomes equal to or higher than first set vehicle velocity V1. At this time, the determination at step 423 indicates Yes and the determination at step 424 indicates Yes. In addition, the determination at step 426 indicates No. Hence, the calculation on the driving force is not executed and the first following control is not started.

As described above, since the first following control is not started in a state wherein the acceleration operation is continued for the predetermined time duration from the time at which set switch 20 or resume switch 21 is operated, when set switch or resume switch is operated while the driver is operating accelerator, the driver has forgotten the request to start the first following control. In such a case where the acceleration is continued for a long period of time, the vehicle velocity control apparatus can prevent the first following control from being executed against the intention of the driver. It is noted that accelerator pedal stroke sensor 18 corresponds to acceleration operation detecting means and steps 408, 412, 423, 424, and 426 correspond to first request allowing means.

Next, a sixth preferred embodiment of the vehicle velocity control apparatus according to the present invention will be described below.

In the sixth preferred embodiment, difference points from the first preferred embodiment are that a target brake liquid pressure P* of the host vehicle is gradually reduced after the stop of the first following control and the second following control is not started when target brake pressure liquid pressure P* is made smaller. In other words, in the sixth preferred embodiment, the procedure shown in FIG. 18 is executed by adaptive cruise controller 9 in place of the calculation procedures shown in FIGS. 3, 4, and 5 described in the first preferred embodiment.

Figure 18:
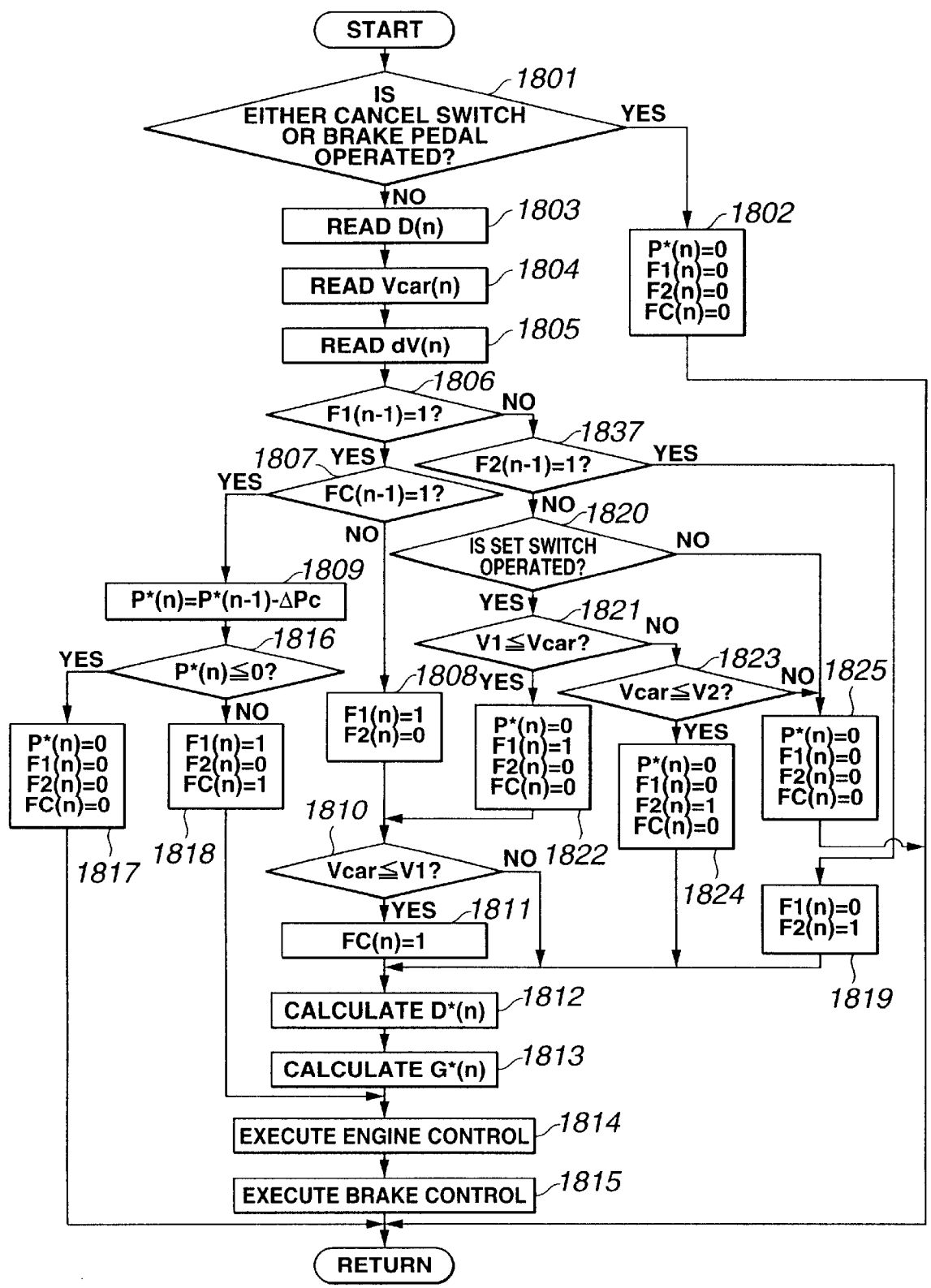
FIG. 18 is an operational flowchart of the vehicle velocity control calculation procedure executed by the adaptive cruise controller in a sixth preferred embodiment according to the present invention.

In details, at a step 1801 shown in FIG. 18, adaptive cruise controller 9 determines if either cancel switch 22 or brake pedal 17 is operated or not. If neither cancel switch nor brake pedal 17 is operated (No), the routine goes to a step 1802. If either cancel switch 22 or brake pedal 17 is operated (Yes) at step 1801, the routine goes to a step 1803. At step 1802, adaptive cruise controller 9 resets each type of flags F1($n$), F2($n$), FC(n) to "0" and zeroes target brake liquid pressure P*(n) and the present vehicle velocity control calculation procedure shown in FIG. 18 is ended. At step 1803, adaptive cruise controller 9 reads inter-vehicle distance D(n) between the host vehicle and the preceding vehicle from radar unit 13 and the routine goes to a step 1804. At step 1804, adaptive cruise controller 9 reads the vehicle velocity Vcar(n) from vehicle velocity sensor 14. Furthermore, the routine goes to a step 1805 at which relative velocity dV(n) of the host vehicle to the preceding vehicle is calculated. Then, the routine goes to a step 1806. At step 1806, adaptive cruise controller 9 determines if a previous value of first following control execution flag F1($n$–1) is in the set state of "1". If F1($n$–1) is in the set state (Yes) at step 1806, the routine goes to a step 1807. If not in the set state (No) at step 1806, the routine jumps to a step 1837.

At step 1807, adaptive cruise controller 9 determines if a previous value of first following control release flag FC($n$–1) is in the set state. If not in the set state at step 1807 (No), the routine goes to a step 1808. If FC(n–1) is in the set state (Yes), the routine goes to a step 1809. At step 1808, adaptive cruise controller 9 sets first following control execution flag F1($n$) to "1" and resets second following control execution flag F2($n$) to "0". Then, the routine goes to a step 1810.

At step 1810, adaptive cruise controller 9 determines if the vehicle velocity of the host vehicle Vcar(n) is equal to or lower than first set vehicle velocity V1. If Vcar≦V1 (Yes) at step 1810, the routine goes to a step 1811. If Vcar>V1 (No) at step 1810, the routine goes to a step 1812. At step 1811, adaptive cruise controller 9 sets first following control release flag FC(n) to "1". Then, the routine goes to step 1812.

At step 1812, adaptive cruise controller 9 calculates a target inter-vehicle distance D*(n) between the preceding vehicle and the host vehicle in accordance with the following equations (1) and (2) and the routine goes to a step 1813. That is to say, in equation (1), adaptive cruise controller 9 calculates a target inter-vehicle distance final value D*$_n$(n) which is a target inter-vehicle distance in a steady-state following run on the basis of vehicle velocity of the preceding vehicle V$_t$(n), an inter-vehicle time duration Th to be secured, and an inter-vehicle distance D$_0$ during the stop of the host vehicle. It is noted that vehicle velocity time duration Th is a time required for the host vehicle to reach to a position of the preceding vehicle. D*$_n$(n)=V$_t$(n)×Th+D$_0$ - - - (1), wherein the vehicle velocity V$_t$(n) of the preceding vehicle is expressed as a sum of vehicle velocity of the host vehicle Vcar(n) and relative velocity dV(n). In equation (2), a target vehicle motion (target inter-vehicle distance) D*(n) is calculated by an approximation thereof using a second-order transfer function in such a manner that a deviation Derr between target inter-vehicle distance final value D*$_n$(n) and actual inter-vehicle distance D(n) is gradually decreased.

D*(n)=(1–a$_0$/(s$^2$+a$_1$s+a$_0$))·Derr+D*$_n$(n) - - - (2). In equation (2), a$_0$=ω$_τ^2$, a$_1$=2ζω$_τ$, s denotes a differential operator, and, if ω$_τ$ and ζ are set at appropriate values, target vehicle motion D*(n) can provide a desired form.

At step 1813, adaptive cruise controller 9 calculates a target acceleration/deceleration (a target acceleration may also be termed since the deceleration means a minus acceleration) G*(n) in accordance with the following equation (3) on the basis of relative velocity dV(n) and an inter-vehicle distance deviation (D–D*) and the routine goes to a step 1814.

G*(n)=fv×dV+fd(D–D*) - - - (3), wherein fv>0, fd>0, fv denotes a vehicle velocity gain, and fd denotes an inter-vehicle distance gain. At step 1814, adaptive cruise controller 9 calculates engine torque command value and gear-speed range shift command value on the basis of target acceleration/deceleration G*(n). At a step 1815, adaptive cruise controller 9 calculates a target brake liquid pressure P*(n) on the basis of target acceleration/deceleration G*(n). Then, the present routine shown in FIG. 18 is ended.

On the other hand, at step 1809 described above, adaptive cruise controller 9 calculates target brake liquid pressure P*(n) in accordance with the following equation (4) and the routine goes to a step 1816. That is to say, $$P^*(n)=P^*(n-1)-\Delta Pc \quad (4).$$

As described above, in the sixth embodiment, when vehicle velocity of host vehicle Vcar becomes equal to or lower than first set vehicle velocity V1 during the first following control, target brake liquid pressure P* is gradually varied toward zero. Hence, a variation in the acceleration/deceleration at a time at which the first following control is stopped becomes moderate.

At step 1816, adaptive cruise controller 9 determines if target brake liquid pressure P*(n) is equal to or below zero. If P*(n)≦0 (Yes) at step 1816, the routine goes to a step 1817. At step 1817, adaptive cruise controller 9 resets target brake liquid pressure P*(n) and each flag F1($n$), F2($n$), and FC(n) to "0" and the vehicle velocity control calculation procedure shown in FIG. 18 is ended. If P*(n)>0 (No) at step 1816, the routine goes to a step 1818. At step 1818, adaptive cruise controller 9 sets first following control execution flag F1($n$) and first following control release flag FC(n) to "1" and resets second following control release flag F2(n) to "0". Then, the routine goes to a step 1815. In addition, at step 1837, adaptive cruise controller 9 determines if a previous value of second following control flag F2($n$–1) is in the set state of "1". If F2($n$–1) is in the set state at step 1837 (Yes), the routine goes to a step 1819. If not in the set state (F2($n$–1)≠1) at step 1837 (No), the routine goes to a step 1820.

At step 1819, adaptive cruise controller 9 resets first following control execution flag F1($n$) to "0" and sets second following control execution flag F2($n$) to "1". Then, the routine goes to a step 1812. In addition, adaptive cruise controller 9 determines if set switch 20 is operated at step 1820. If set switch 20 is operated at step 1820 (Yes), the routine goes to a step 1821. If not operated (No) at step 1820, the routine goes to a step 1825.

At step 1821, adaptive cruise controller 9 determines if vehicle velocity of host vehicle Vcar becomes equal to or higher than first set vehicle velocity V1 (for example, equal to or higher than 50 Km/h). If Vcar≧V1 (Yes) at step 1821, the routine goes to a step 1822. If Vcar<V1 (No) at step 1821, the routine goes to a step 1823. At step 1822, adaptive cruise controller 9 sets first following control execution flag F1(n) to "1" (the other flags F2(n) and FC(n) are reset to "0" and target brake liquid pressure P*(n) is zeroed). Then, the routine goes to step 1810. At step 1823, adaptive cruise controller 9 determines if vehicle velocity of host vehicle Vcar is equal to or lower than second set vehicle velocity V2. If Vcar≦V2 (Yes) at step 1823, the routine goes to a step 1824. At step 1824, adaptive cruise controller 9 only sets second following control execution flag F2(n) to "1" and the routine goes to step 1812. If Vcar>V2 (No) at step 1823, the routine goes to step 1825. At step 1825, adaptive cruise controller 9 zeroes target brake liquid pressure P*(n) and resets each flag F1(n), F2(n), and FC(n) to "0". Then, the present routine shown in FIG. 18 is ended.

Next, a specific operation of the sixth preferred embodiment of the vehicle velocity control apparatus will be described below using the example in which the host vehicle in which the sixth preferred embodiment of the vehicle velocity control apparatus is mounted is running on the freeway.

Suppose that, with the freeway on which the host vehicle is running empty, vehicle velocity of host vehicle Vcar falls in the speed range equal to or higher than first set vehicle velocity V1 and the driver operates set switch 20. In this case, the determination at step 1801 indicates once Yes. But, the subsequently executed routine, the determination at step 1801 indicates No and the routine shown in FIG. 18 goes from step 1803 to step 1805 via step 1804. Then, the determination at step 1806 indicates No and the determination at step 1837 indicates No. The determination at step 1820 indicates Yes and the determination at step 1821 indicates Yes and the first following control execution flag F1(n) is set to "1". In addition, the determination at step 1810 indicates No. Then, the routine shown in FIG. 18 passes from step 1810 toward step 1815. Hence, the first driving force is calculated and the first following control is executed.

In addition, suppose that the freeway road becomes crowded during the execution of the first following control and, then, vehicle velocity of host vehicle Vcar becomes decreased largely so as to become equal to or lower than first set vehicle velocity V1.

In this case, the determination at step 1801 indicates once Yes. At the subsequently executed routine, the determination at step 1801 indicates No and the determination at step 1807 indicates No. Then, the routine goes to step 1808. Then, the determination at step 1810 indicates Yes. Then, following control release flag FC(n) is set to "1" at step 1811. Then, the routine goes to step 1815 from step 1812. Then, the present vehicle velocity control calculation procedure shown in FIG. 18 is ended. Then, at the next vehicle velocity control calculation procedure of FIG. 18, the determination at step 1807 indicates Yes and, at step 1809, target brake liquid pressure P*(n) is reduced by ΔPc. Then, the routine goes to step 1818. Then, the routine goes to step 1815. Then, the present vehicle velocity control calculation procedure is ended. Such a series of flows are repeated so that target brake liquid pressure P* is gradually reduced. As described above, after the first following control is stopped, target brake liquid pressure P* is gradually reduced. In other words, since the deceleration is gradually reduced, the velocity of the host vehicle Vcar becomes equal to or lower than first set vehicle velocity V1. Even if the first following control is stopped, an abrupt reduction in the deceleration (so-called, G drop) and/or a feeling like a receipt of a nose dive is not given to occupants (including the driver) of the host vehicle.

Figure 19A:
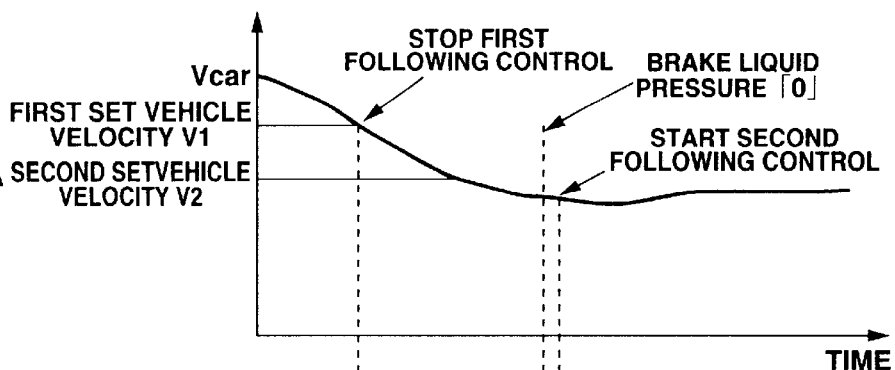
FIGS. 19A, 19B, and 19C are characteristic graphs for explaining an operation of the sixth preferred embodiment of the vehicle velocity control apparatus according to the present invention.
Figure 19B:
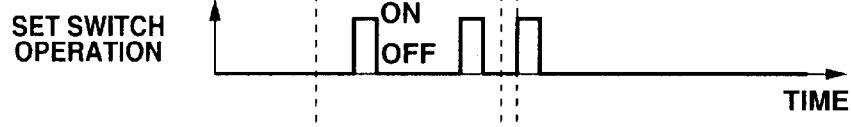
Figure 19C:
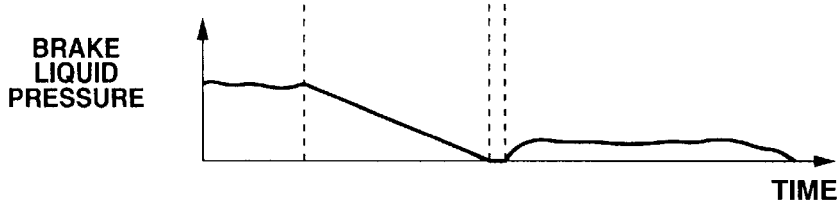

Thereafter, suppose that vehicle velocity of host vehicle Vcar becomes lower than second set vehicle velocity V2 and the driver of host vehicle operates set switch 20 before target brake liquid pressure P* indicates zero to try to start the second following control, as shown in FIGS. 19A, 19B, and 19C. However, the above-described cycles are repeated and the vehicle velocity control calculation procedure is ended without the determination of whether set switch 20 is operated or not. Hence, the second following control is not started.

As described above, since the second following control is not started when target brake liquid pressure P* of the host vehicle is reduced, the abrupt reduction in the deceleration (or G drop) or feeling like the receipt of nose dive is not given to the driver (occupants) even if target acceleration/deceleration G*(n) is initialized to zero when the second following control is tried to be started. Thereafter, suppose that, after target brake liquid pressure P* indicates zero, the driver operates again set switch 20, as shown in FIGS. 19A through 19C. At this time, the determination at step 1806 indicates No and the determination at step 1837 indicates No. The determination at step 1820 indicates Yes. The determination at step 1821 indicates No. The determination at step 1823 indicates Yes. Then, at step 1824, adaptive cruise controller 9 sets only second following control execution flag F2(n) to "1". Then, the routine goes to step 1815. Then, the routine goes to step 1815 so that the second driving force is calculated. Consequently, the second following control is executed.

It is noted that step 1809 corresponds to deceleration gradual reduction controlling means and steps 1815, 1816, and 1820 correspond to second following control means.

Next, a seventh preferred embodiment of the vehicle velocity control apparatus according to the present invention will be described below.

Difference points in the seventh preferred embodiment from the sixth preferred embodiment are that, utilizing target acceleration/deceleration G*(n) in place of target brake liquid pressure P*, target brake liquid pressure P* of host vehicle approaches gradually to zero after the first following control is stopped and, while target acceleration/deceleration G*(n) is approaching to zero, the second following control is not started.

Figure 20:
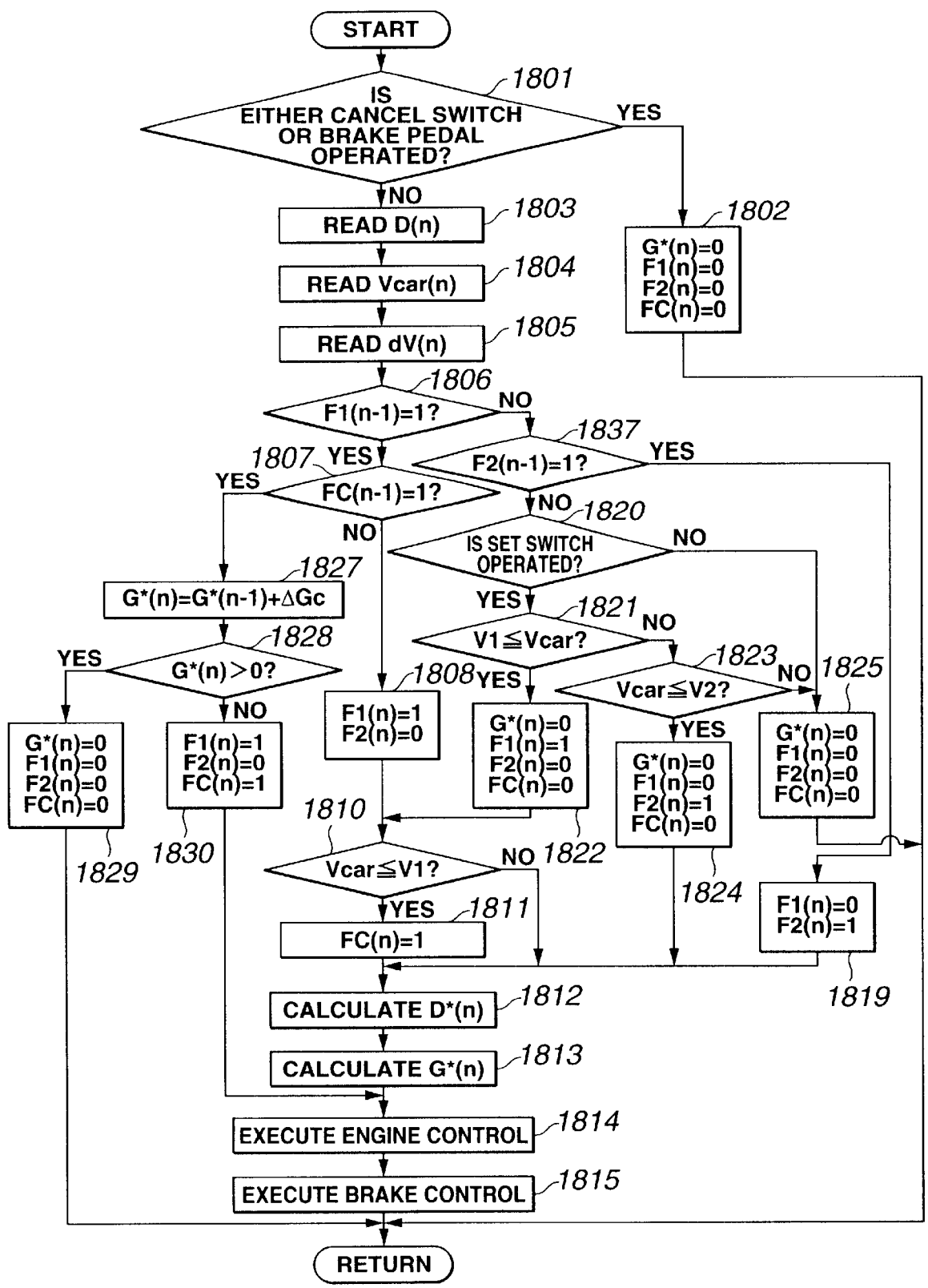
FIG. 20 is an operational flowchart of the vehicle velocity control calculation procedure executed by the adaptive cruise controller in a seventh preferred embodiment according to the present invention and which corresponds to FIG. 18.

In other words, in the seventh embodiment, from among the procedures executed by adaptive cruise controller 9, steps 1827 through 1830 are added to the vehicle velocity control calculation procedure shown in FIG. 18, in place of steps 1809, 1816, 1817, and 1818 shown in FIG. 18 and described in the sixth preferred embodiment, as appreciated from FIG. 20. The other steps of FIG. 20 are the same as those shown in FIG. 18 and the detailed description thereof will herein be omitted.

At step 1807, adaptive cruise controller 9 determines whether first following control release flag FC(n−1) is in the set state of "1". If FC(n−1) is in the set state at step 1807 (Yes), the routine goes to step 1827. If not in the set state at step 1807 (No), the routine goes to step 1808. At step 1827, adaptive cruise controller 9 calculates target acceleration/deceleration G*(n) in accordance with the following equation (5) and the routine goes to step 1828. That is to say, $G^*(n)=G^*(n-1)+\Delta Gc$, wherein $\Delta Gc>0$ - - - (5).

At step 1828, adaptive cruise controller 9 determines if target acceleration/deceleration G*(n) is larger than zero. If G*(n)>0 (Yes) at step 1828, the routine goes to step 1829 at which all of target acceleration/deceleration G*(n) and flags F1(n), F2(n), and FC(n) are reset to "0" and the present vehicle velocity calculation procedure shown in FIG. 20 is ended.

At step 1830, each of first following control execution flag F1(n) and first following control release flag FC(n) is set to "1" and the routine goes to step 1814.

Next, a specific operation of the seventh preferred embodiment will be described in details below using an example in which the host vehicle in which the seventh preferred embodiment of the vehicle velocity control apparatus according to the present invention is mounted is running on the freeway.

First, suppose that, while the host vehicle is running to follow the preceding vehicle in the first following control, the freeway road becomes congested so that velocity of the host vehicle Vcar is largely decreased and becomes equal to or lower than first set vehicle velocity V1. The determination at step 1801 indicates once Yes but at the subsequently executed routine, the determination at step 1801 indicates No and the determination at step 1806 indicates Yes. Then, the routine shown in FIG. 20 goes to step 1808. The determination at step 1810 indicates Yes. At the next step 1811, following control release flag FC(n) is set to "1". Then, the routine goes to step 1812. Then, the routine goes to step 1815. The present vehicle velocity control calculation process shown in FIG. 20 is ended.

Then, from each subsequently executed vehicle velocity control calculation procedure of FIG. 20, the determination at step 1820 indicates Yes. In addition, at step 1827, adaptive cruise controller 9 reduces deceleration of target acceleration/deceleration G* by ΔGc. The routine goes to step 1930. The routine goes to step 1815. Then, the vehicle velocity control calculation procedure shown in FIG. 20 is ended. This flow cycle is repeated. Hence, deceleration of target acceleration/deceleration G* of the host vehicle is gradually reduced.

As described above, since target acceleration/deceleration G* of the host vehicle is gradually reduced after the first following control is stopped, the velocity of the host vehicle becomes equal to or lower than first set vehicle velocity V1. Even if the first following control is stopped, such a G drop that the deceleration is abruptly reduced and/or the feeling like the receipt of nose dive is not given to the vehicular occupant.

Figure 21A:
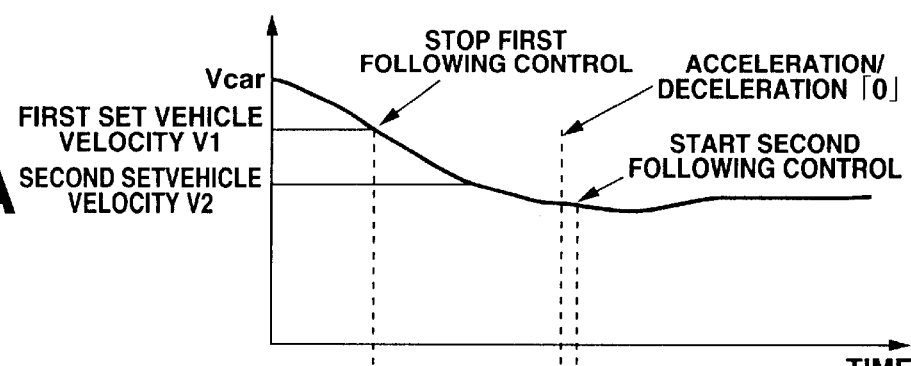
FIGS. 21A, 21B, and 21C show characteristic graphs for explaining an operation of the seventh preferred embodiment of the vehicle velocity controlling apparatus according to the present invention.
Figure 21B:
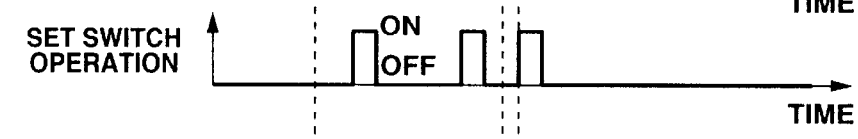
Figure 21C:
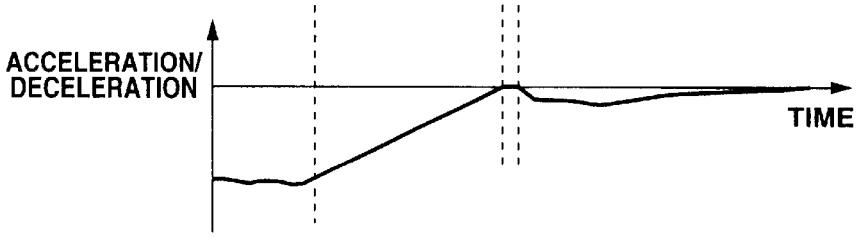

Suppose, then, that the driver operates set switch 20 before target acceleration/deceleration G* indicates zero for the driver to try to start second following control, as shown in FIGS. 21A, 21B, and 21C. Then, the above-described flow cycle is repeated, the vehicle velocity control calculation procedure shown in FIG. 20 is ended without determination of whether set switch 20 is operated, and the second following control is not started.

As described above, since the second following control is not started when deceleration of target acceleration/deceleration G* is reduced, such G drop that the deceleration is abruptly reduced and/or the feeling like the receipt of nose dive are not given to the vehicular occupant.

In the seventh embodiment, step 1827 corresponds to deceleration gradual reducing controlling means and steps 1815, 1828, and 1820 correspond to second following control means.

Next, an eighth preferred embodiment of the vehicle velocity control apparatus according to the present invention will be described below.

A difference point of the eighth preferred embodiment from the seventh preferred embodiment is that, until a predetermined time duration has passed from a time point at which the first following control is stopped, the second following control is not started even if set switch 20 is operated.

Figure 22:
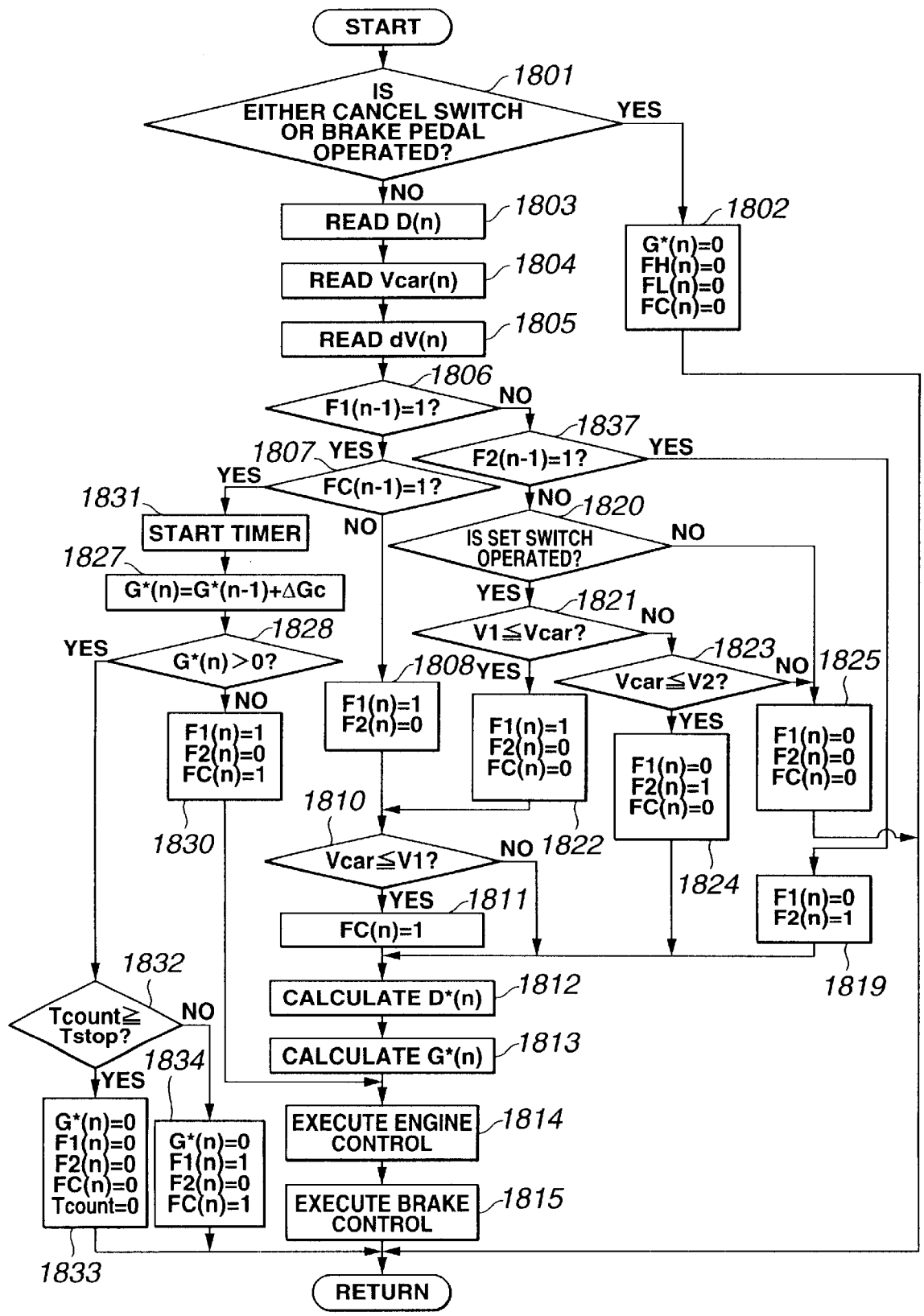
FIG. 22 shows an operational flowchart of the vehicle velocity control procedure in a case of an eighth preferred embodiment of the vehicle velocity controlling apparatus according to the present invention.

In the eighth preferred embodiment, a step 1831 is interposed between step 1807 and step 1827 and a step 1832, a step 1833, and a step 1834 are interposed between steps 1828 and the return instruction box so as to be added to the vehicle velocity control calculation procedure shown in FIG. 20, as shown in FIG. 22, from among the procedures executed by adaptive cruise controller 9. At step 1831, adaptive cruise controller 9 activates the timer operated in the background job. At step 1832, adaptive cruise controller 9 determines if operation time duration Tcount of the timer is equal to or larger (longer) than predetermined time Tstop (for example, 10 seconds), in place of step 1829. At step 1833, adaptive cruise controller 9 zeroes target acceleration/deceleration G*(n) and resets each flag F(n), F2(n), and FC(n) to "0" if Tcount≧Tstop at step 1832. Thereafter, the present vehicle velocity calculation procedure of FIG. 22 is ended. At step 1834, adaptive cruise controller 9 sets first following control execution flag F1(n) and following control release flag FC(n) to the set state of "1" if Tcount<Tstop at step 1832. The other steps shown in FIG. 22 are the same as those shown in FIG. 20. The detailed description of the same numbered steps in FIG. 22 as those shown in FIG. 20 will herein be omitted.

Next, a specific operation of the eighth preferred embodiment will be described below when the host vehicle in which the vehicle velocity control apparatus in the eighth preferred embodiment is mounted is running on the freeway.

Suppose, first, that the freeway road becomes congested during the execution of the first following control by the host vehicle so that vehicle velocity Vcar of the host vehicle is largely reduced and becomes equal to or lower than first set vehicle velocity V1. In this case, the determination at step 1801 once Yes but, at the subsequently executed routine, the determination at step 1801 indicates No and the determination at step 1806 indicates Yes. The routine goes to step 1808. The determination at step 1810 indicates Yes. At step 1811, adaptive cruise controller 9 sets following control release flag FC(n) to "1". The routine goes to step 1812. The routine finally goes to step 1815. The present vehicle velocity control calculation procedure shown in FIG. 22 is ended.

Then, from each subsequently executed vehicle velocity calculation procedure shown in FIG. 22, the determination at step 1820 indicates Yes. Thereafter, the determination at step 1807 indicates Yes. At step 1831, the timer is started. At step 1827, adaptive cruise controller 9 reduces target acceleration/deceleration G* by ΔGc (G*(n)=G*(n−1)+ΔGc). Thereafter, the routine goes to step 1815. Then, the vehicle velocity control calculation procedure shown in FIG. 22 is ended. In this way, such a flow as described above is repeated so that deceleration of target acceleration/deceleration G* is gradually reduced. Suppose that the driver operates set switch 20 before the predetermined time duration has passed from a time point at which the vehicle velocity Vcar of host vehicle becomes equal to or lower than second set vehicle velocity V2 to try to start the second following control, as shown in FIGS. 23A through 23C. At this time, the determination at step 1828 indicates Yes and the determination at step 1832 indicates No. The vehicle velocity control calculation procedure is ended without determination of adaptive cruise controller 9 if set switch 20 is operated. Hence, the second following control is not started.

As described above, since the second following control is not started until the predetermined time duration Tstop has passed from the time point at which the first following control is stopped, the second following control is not immediately executed even if vehicle velocity Vcar of the host vehicle is reduced from the speed range equal to or higher than the first set vehicle velocity V1 to the other speed range equal to or lower than second set vehicle velocity V2.

Consequently, the driver can accurately determine which of the following controls is executed. It is noted that step 1832 shown in FIG. 22 corresponds to second request allowing means.

Next, a ninth preferred embodiment of the vehicle velocity control apparatus according to the present invention will be described in details below.

A difference point in the ninth preferred embodiment from the seventh preferred embodiment is that the second following control is started with target acceleration/deceleration G* at a time point at which set switch 20 is operated as an initial value thereof when target acceleration/deceleration G* of the host vehicle is gradually reduced after the stop of the first following control.

Figure 24:
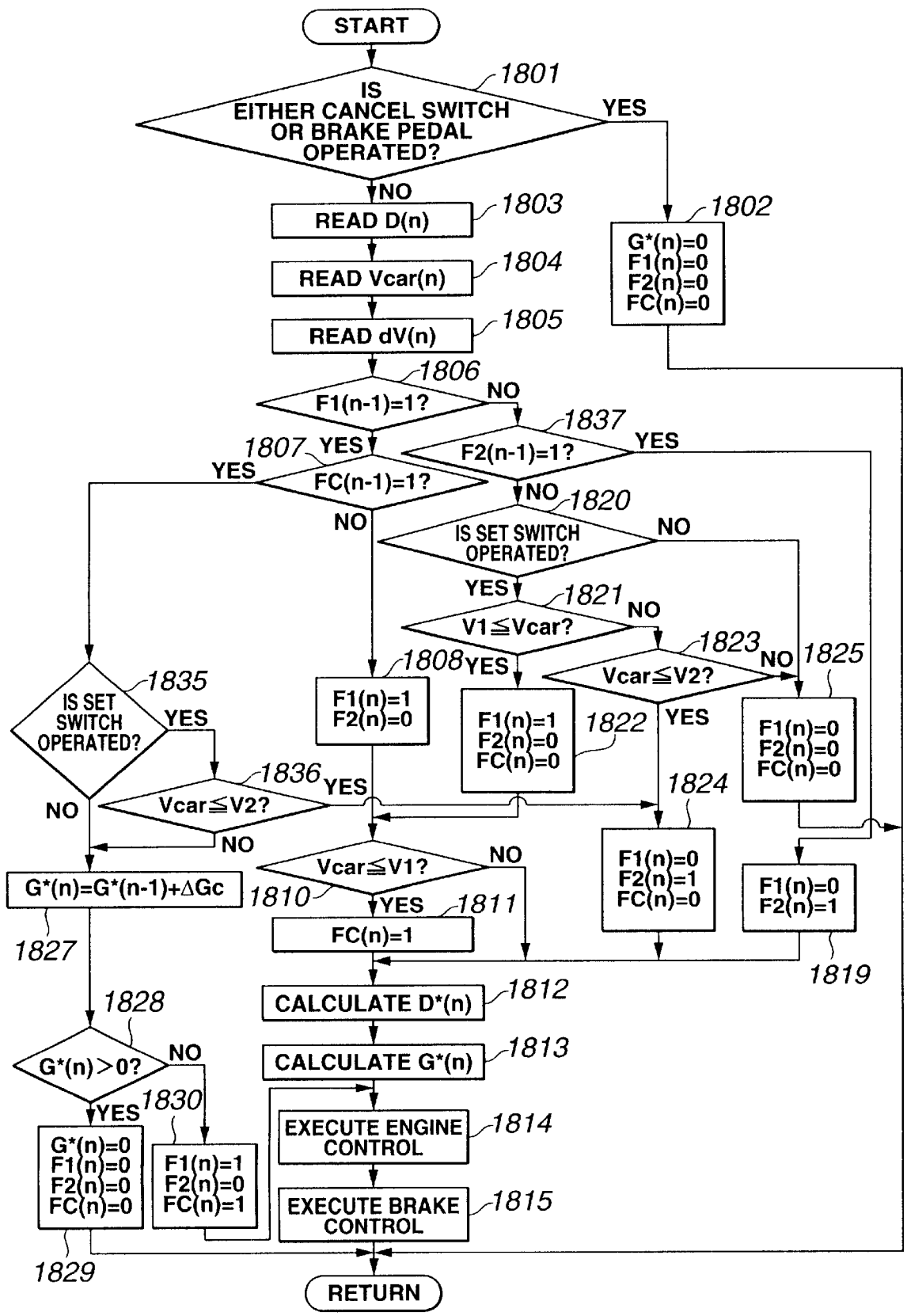
FIG. 24 is an operational flowchart of the vehicle velocity calculation procedure corresponding to FIG. 20 in a case of a ninth preferred embodiment of the vehicle velocity control apparatus according to the present invention.
Figure 25A:
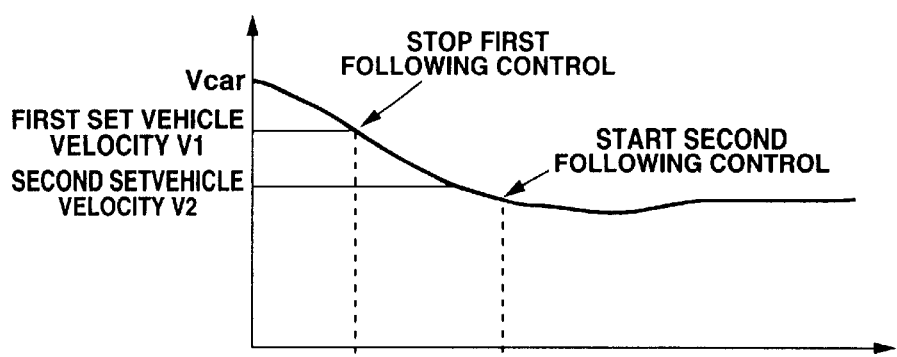
FIGS. 25A, 25B, and 25C are characteristic graphs for explaining an operation of the vehicle velocity control apparatus in the ninth preferred embodiment according to the present invention.
Figure 25B:
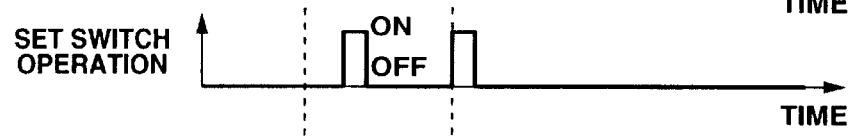
Figure 25C:
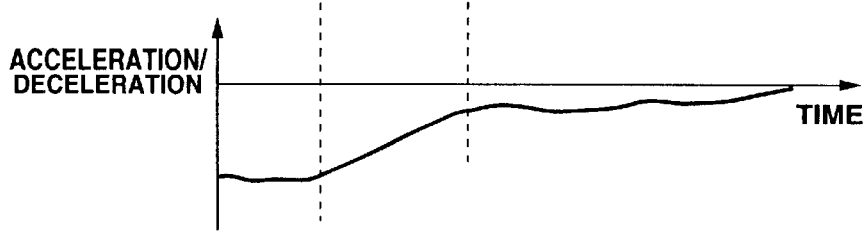

Steps 1835 and 1836 are newly interposed between steps 1807 and 1827 shown in FIG. 20 described in the seventh preferred embodiment, as shown in FIG. 24. In details, at step 1835, adaptive cruise controller 9 determines if set switch 20 is operated or not. If operated (Yes) at step 1835, the routine goes to step 1836. If not operated (No) at step 1835, the routine goes to step 1827. At step 1836, adaptive cruise controller 9 determines if the vehicle velocity of the host vehicle Vcar is equal to or below second set vehicle velocity V2. If Vcar≦V2 (Yes) at step 1836, the routine goes to step 1824. If Vcar>V2 (No) at step 1836, the routine goes to step 1827. The other steps shown in FIG. 24 are the same as those shown in FIG. 20 described in the seventh preferred embodiment. The detailed description of the other steps corresponding to FIG. 20 will herein be omitted.

Next, a specific operation of the ninth preferred embodiment according to the present invention will be described using the example in which the host vehicle in which the ninth preferred embodiment of the vehicle velocity control apparatus is mounted is running on the freeway.

First, suppose that the running road becomes crowded while the host vehicle is controlled in which the first following control is being executed so that vehicle velocity Vcar of the host vehicle is largely reduced and becomes equal to or lower than first set vehicle velocity V1. In this case, the determination at step 1801 indicates once Yes. At the subsequently executed routine, the determination at step 1801 indicates No and the determination at step 1806 indicates No. The subsequently executed routine goes to step 1808 and goes to step 1810. The determination at step 1810 indicates Yes. At this time, the following control release flag FC(n) is set to "1" at step 1811. The routine, then, goes to step 1812. The routine, then, goes to step 1815 via steps 1813 and 1814. The vehicle velocity control calculation procedure is ended. Then, from the further subsequently executed vehicle velocity control calculation procedure, the determination at step 1820 indicates Yes. However, thereafter, the determination at step 1835 indicates No. At step 1827, target acceleration/deceleration G* is enlarged by ΔGc. The routine goes to step 1815 via steps 1828 and 1830. The vehicle velocity control calculation procedure is ended. Such a flow cycle as described above is repeated so that deceleration value of target acceleration/deceleration G* is gradually reduced.

Suppose, then, that the driver operates set switch 20 with the vehicle velocity Vcar of host vehicle equal to or lower than second set vehicle velocity V2 before target acceleration/deceleration G* indicates zero to try to start the second following control. The determination at step 1835 indicates Yes. The routine goes to step 1836 at which the determination indicates Yes and the routine goes to step 1815 via step 1824. Thus, the second following control is started.

As described above, since, in the ninth preferred embodiment, the second following control is started with target acceleration/deceleration G* at the time point at which set switch 20 is operated as the initial value, such a G drop that the deceleration is abruptly reduced and/or the feeling like the receipt of nose dive is not given to the driver (vehicular occupants) even if target acceleration/deceleration G*(n) is initialized to indicate zero when the second following control is started. In the ninth embodiment, step 1827 corresponds to deceleration gradual reducing control means and steps 1820, 1835, and 1836 correspond to second following control means.

Various modifications and variations of the present invention can be made by those skilled in the art without departing from the sprit of the invention. For example, in each of the first to ninth preferred embodiments, the laser radar is used for radar unit 13. However, the present invention is not limited to this but is applicable to another range (inter-vehicle distance) measuring instrument such as a millimeter wave-length radar.

In each of the first to ninth preferred embodiments, adaptive cruise controller 9 implements the vehicular velocity calculation procedure using installed software. However, the present invention is not limited to this. The present invention is applicable to a hardware constituted by an electronic circuitry such a combination as a function generator, a comparator, and a calculator. In addition, in each embodiment, each disc brake 7 constitutes a brake actuator. However, the present invention is not limited to this. The present invention is applicable to other brake actuators such as drum brakes and to electrically controlled brake actuators. Furthermore, in each of the first to ninth embodiments, engine 2 has been described as a rotational driving source. However, the present invention is not limited to this. The present invention is applicable to an electric motor. The present invention is applicable to a hybrid vehicle in which the engine and the electric motor are used.

The entire contents of a Japanese Patent Application No. 2001-038923 (filed in Japan on Feb. 15, 2001) are herein incorporated by reference. The scope of the invention is defined with reference to the following claims.

What is claimed is:

1. A vehicle velocity control apparatus for an automotive vehicle, comprising:

a vehicle velocity detecting section that detects a velocity of the vehicle;

a preceding vehicle detecting section that detects a preceding vehicle which is running ahead of the vehicle;

a first following vehicle velocity control section that executes a first following control to control the vehicle velocity of the vehicle to make the vehicle velocity of the vehicle substantially equal to a predetermined vehicle velocity when no preceding vehicle is detected and, when the preceding vehicle is detected, to make the vehicle follow the preceding vehicle with the predetermined vehicle velocity as an upper limit on the basis of detected results by the vehicle velocity detecting section and the preceding vehicle detecting section;

a first following control start requesting section that requests the first following vehicle velocity control section to start the first following control;

a second following vehicle velocity control section that executes a second following control to control the velocity of the vehicle to make the vehicle follow the preceding vehicle when the preceding vehicle is detected on the basis of the detected results by the vehicle velocity detecting section and the preceding vehicle detecting section;

a second following control start requesting section that requests the second following vehicle velocity control section to start the second following control:

a first request allowing section, included in the first following vehicle velocity control section, that allows the request to start the first following control from the first following control start requesting section when the vehicle velocity of the vehicle detected by the vehicle velocity detecting section falls in a velocity range equal to or higher than a preset first set vehicle velocity; and a second request allowing section, included in the second following vehicle velocity control section, that allows the request to start the second following control from the second control start requesting section when the velocity of the vehicle falls in another velocity range which is equal to or lower than a preset second set vehicle velocity which is lower than the first set vehicle velocity.

2. A vehicle velocity control apparatus for an automotive vehicle as claimed in claim 1, wherein the first following vehicle velocity control section comprises a first following control stop section that stops the first following control when the vehicle velocity of the vehicle detected by the vehicle velocity detecting section becomes lower than the first set vehicle velocity.

3. A vehicle velocity control apparatus for an automotive vehicle as claimed in claim 2, wherein the second request allowing section rejects the request to start the second following control from the second following control start requesting section for a predetermined period of time from a time at which the first following control stop section stops the first following control.

4. A vehicle velocity control apparatus for an automotive vehicle as claimed in claim 2, further comprising a deceleration manipulation detecting section that detects a deceleration manipulation by a vehicle driver and wherein the second request allowing section allows the request to start the second following control from the second following control start requesting section when the velocity of the vehicle detected by the vehicle velocity detecting section becomes equal to or lower than the second set vehicle velocity according to the deceleration manipulation by the vehicle driver detected by the deceleration manipulation detecting section after the first following control stop section stops the first following control.

5. A vehicle velocity control apparatus for an automotive vehicle as claimed in claim 2, further comprising a deceleration reduction control section that executes a deceleration reduction control to gradually reduce the deceleration of the vehicle after the first following control stop section stops the first following control and wherein the second request allowing section rejects the request to start the second following control from the second control start requesting section while the deceleration reduction control section executes the deceleration reduction control.

6. A vehicle velocity control apparatus for an automotive vehicle as claimed in claim 2, further comprising a deceleration reduction control section that executes a deceleration reduction control to gradually reduce the deceleration of the vehicle after the first following control stop section stops the first following control and wherein the second following vehicle velocity control section executes the second following control, with a vehicular motion at a time point at which the second request allowing section allows the request to start the second following control from the second following control start requesting section as an initial value, while the deceleration reduction control section executes the deceleration reduction control.

7. A vehicle velocity control apparatus for an automotive vehicle as claimed in claim 1, wherein the second following vehicle control section comprises a second following control stop section that stops the second following control when the vehicle velocity of the vehicle detected by the vehicle velocity detecting section become higher than the second set vehicle velocity.

8. A vehicle velocity control apparatus for an automotive vehicle as claimed in claim 1, further comprising an acceleration manipulation detecting section that detects an acceleration manipulation by a vehicle driver and wherein the first request allowing section allows the request to start the first following control when the request to start the first following control is issued from the first following control start requesting section while the acceleration manipulation detecting section detects the acceleration manipulation by the driver and the acceleration manipulation is ended in a state in which the velocity of the vehicle falls in the velocity range which is equal to or higher than the first set vehicle velocity.

9. A vehicle velocity control apparatus for an automotive vehicle as claimed in claim 1, further comprising an acceleration manipulation detecting section that detects an acceleration manipulation by a vehicle driver and wherein the first request allowing section rejects the request to start the first following control when the request to start the first following control is issued from the first following control start requesting section while the acceleration manipulation detecting section detects the acceleration manipulation by the driver and the acceleration manipulation by the driver detected by the acceleration manipulation detecting section is continued for a predetermined period of time from a time point at which the request to start the first following control is issued from the first following control start requesting section.

10. A vehicle velocity control apparatus for an automotive vehicle as claimed in claim 5, wherein the deceleration reduction control section comprises a target brake liquid pressure calculation section that calculates a present target brake liquid pressure $P^*(n)$ as follows: $P^*(n)=P^*(n-1)-\Delta Pc$, wherein $P^*(n-1)$ denotes one control period previous value of the target brake liquid pressure and $\Delta Pc$ denotes a constant pressure value; after the first following control stop section stops the first following control stop section stops the first following control.

11. A vehicle velocity control apparatus for an automotive vehicle as claimed in claim 10, wherein the second request allowing section allows the request to start the second following control from the second control start requesting section when the target brake liquid pressure $P^*(n)$ is reduced to zero.

12. A vehicle velocity control apparatus for an automotive vehicle as claimed in claim 10, wherein the deceleration control section comprises a target acceleration/deceleration calculation section that calculates a present target acceleration/deceleration $G^*(n)$ as follows: $G^*(n)=G^*(n-1)+\Delta Gc$, wherein $\Delta Gc>0$ and wherein the second request allowing section rejects the request to start the second following control from the second control start requesting section while the target brake liquid pressure $P^*(n)$ is reduced toward zero and the target acceleration/deceleration $G^*(n)$ is approaching to zero.

13. A vehicle velocity control apparatus for an automotive vehicle as claimed in claim 12, further comprising a timer to measure a time duration from a time at which the first following control stop section stops the first following control and wherein the second request allowing section rejects the request to start the second following control from the second following control start requesting section until the time duration measured by the timer becomes equal to or longer than a predetermined period of time.

14. A vehicle velocity control apparatus for an automotive vehicle as claimed in claim 6, wherein the vehicular motion comprises a target acceleration/deceleration of the vehicle.

15. A vehicle velocity control apparatus for an automotive vehicle, comprising:

vehicle velocity detecting means for detecting a velocity of the vehicle;

preceding vehicle detecting means for detecting a preceding vehicle which is running ahead of the vehicle;

first following vehicle velocity control means for executing a first following control to control the vehicle velocity of the vehicle to make the vehicle velocity of the vehicle substantially equal to a predetermined vehicle velocity when no preceding vehicle is detected and, when the preceding vehicle is detected, to make the vehicle follow the preceding vehicle with the predetermined vehicle velocity as an upper limit on the basis of detected results by the vehicle velocity detecting means and the preceding vehicle detecting means;

first following control start requesting means for requesting the first following vehicle velocity control section to start the first following control;

second following vehicle velocity control means for executing a second following control to control the velocity of the vehicle to make the vehicle follow the preceding vehicle when the preceding vehicle is detected on the basis of the detected results by the vehicle velocity detecting means and the preceding vehicle detecting means;

second following control start requesting means for requesting the second following vehicle velocity control section to start the second following control:

first request allowing means, included in the first following vehicle velocity control means, for allowing the request to start the first following control from the first following control start requesting means when the vehicle velocity of the vehicle detected by the vehicle velocity detecting means falls in a velocity range equal to or higher than a preset first set vehicle velocity; and second request allowing means, included in the second following vehicle velocity control means, for allowing the request to start the second following control from the second control start requesting means when the velocity of the vehicle falls in another velocity range which is equal to or lower than a preset second set vehicle velocity which is lower than the first set vehicle velocity.

16. A vehicle velocity control method for an automotive vehicle, comprising:

detecting a velocity of the vehicle;

detecting a preceding vehicle which is running ahead of the vehicle;

executing a first following control to control the vehicle velocity of the vehicle to make the vehicle velocity of the vehicle substantially equal to a predetermined vehicle velocity when no preceding vehicle is detected and, when the preceding vehicle is detected, to make the vehicle follow the preceding vehicle with the predetermined vehicle velocity as an upper limit on the basis of detected results in detecting the vehicle velocity of the vehicle and detecting the preceding vehicle;

requesting to start the first following control;

executing a second following control to control the velocity of the vehicle to make the vehicle follow the preceding vehicle when the preceding vehicle is detected on the basis of the detected results in detecting the vehicle velocity of the vehicle and detecting the preceding vehicle;

requesting to start the second following control:

allowing the request to start the first following control when the detected vehicle velocity of the vehicle falls in a velocity range equal to or higher than a preset first set vehicle velocity; and allowing the request to start the second following control when the detected velocity of the vehicle falls in another velocity range which is equal to or lower than a preset second set vehicle velocity which is lower than the first set vehicle velocity.

* * * * *